(12) United States Patent
Brown et al.

(10) Patent No.: US 11,237,971 B1
(45) Date of Patent: Feb. 1, 2022

(54) COMPILE TIME LOGIC FOR DETECTING STREAMING COMPATIBLE AND BROADCAST COMPATIBLE DATA ACCESS PATTERNS

(71) Applicant: SambaNova Systems, Inc., Palo Alto, CA (US)

(72) Inventors: Kevin James Brown, Belmont, CA (US); David Alan Koeplinger, Menlo Park, CA (US); Weiwei Chen, Mountain View, CA (US); Xiaoming Gu, Campbell, CA (US)

(73) Assignee: SambaNova Systems, Inc., Palo Alto, CA (US)

( * ) Notice: Subject to any disclaimer, the term of this patent is extended or adjusted under 35 U.S.C. 154(b) by 0 days.

(21) Appl. No.: 17/023,015

(22) Filed: Sep. 16, 2020

(51) Int. Cl.
*G06F 12/00* (2006.01)
*G06F 13/00* (2006.01)
*G06F 13/28* (2006.01)
*G06F 12/0842* (2016.01)
*G06F 5/10* (2006.01)
*G06F 11/30* (2006.01)

(52) U.S. Cl.
CPC ............ *G06F 12/0842* (2013.01); *G06F 5/10* (2013.01); *G06F 11/3072* (2013.01); *G06F 2205/123* (2013.01); *G06F 2212/1016* (2013.01); *G06F 2212/45* (2013.01)

(58) Field of Classification Search
CPC .... G06F 12/0842; G06F 11/3072; G06F 5/10; G06F 2205/123

USPC ........................................................ 711/154
See application file for complete search history.

(56) References Cited

U.S. PATENT DOCUMENTS

| | | | |
|---|---|---|---|
| 2018/0210730 A1* | 7/2018 | Sankaralingam | G06F 9/3455 |
| 2020/0005155 A1* | 1/2020 | Datta | G06N 3/10 |
| 2020/0034306 A1* | 1/2020 | Luo | G06F 12/0292 |

OTHER PUBLICATIONS

IEEE search results (Year: 2021).*

* cited by examiner

*Primary Examiner* — Edward J Dudek, Jr.
*Assistant Examiner* — Sidney Li
(74) *Attorney, Agent, or Firm* — Haynes Beffel & Wolfeld LLP; Bruce A. Young

(57) ABSTRACT

A dataflow graph for an application has operation units that are configured to be producers and consumers of tensors. A write access pattern of a particular producer specifies an order in which the particular producer generates elements of a tensor, and a read access pattern of a corresponding consumer specifies an order in which the corresponding consumer processes the elements of the tensor. The technology disclosed detects conflicts between the producers and the corresponding consumers that have mismatches between the write access patterns and the read access patterns. A conflict occurs when the order in which the particular producer generates the elements of the tensor is different from the order in which the corresponding consumer processes the elements of the tensor. The technology disclosed resolves the conflicts by inserting buffers between the producers and the corresponding consumers.

20 Claims, 13 Drawing Sheets

| Producers | Write Access Pattern | Consumers | Read Access Pattern | Classification |
|---|---|---|---|---|
| ReLU 522 | A | Add 504 | A | Streaming Compatible |
| ReLU 522 | A | Softmax 512 | B | Broadcast Compatible |
| ReLU 522 | A | Tanh 524 | A | Streaming Compatible |
| Add 504 | A | Sigmoid 506 | A | Streaming Compatible |
| Softmax 512 | B | GeMM 514 | C | Broadcast Compatible |
| Tanh 524 | - | GeMM 526 | D | Broadcast Compatible |
| Sigmoid 506 | A | Layer Norm 516 | E | Broadcast Compatible |
| GeMM 514 | C | Layer Norm 516 | E | Broadcast Compatible |
| GeMM 526 | D | Layer Norm 516 | E | Broadcast Compatible |
| Layer Norm 516 | E | GeMM 508 | F | Broadcast Compatible |
| Layer Norm 516 | E | GeMM 518 | F | Broadcast Compatible |

1302 — storing a dataflow graph for an application, the dataflow graph having operation units that are configured to be producers to produce tensors for execution of the application, and to be consumers to consume the tensors for execution of the application 1312 — storing write access patterns of the producers, and read access patterns of the consumers 1322 — detecting conflicts between certain ones of the producers and corresponding ones of the consumers that have mismatches between the write access patterns and the read access patterns 1332 — resolving the conflicts by inserting buffers between the certain ones of the producers and the corresponding ones of the consumers

FIG. 13

COMPILE TIME LOGIC FOR DETECTING STREAMING COMPATIBLE AND BROADCAST COMPATIBLE DATA ACCESS PATTERNS

INCORPORATIONS

The following are incorporated by reference for all purposes as if fully set forth herein:

Prabhakar et al., "Plasticine: A Reconfigurable Architecture for Parallel Patterns," ISCA '17, Jun. 24-28, 2017, Toronto, ON, Canada;

Koeplinger et al., "Spatial: A Language And Compiler For Application Accelerators," Proceedings Of The 39th ACM SIGPLAN Conference On Programming Language Design And Embodiment (PLDI), Proceedings of the 43rd International Symposium on Computer Architecture, 2018;

U.S. Nonprovisional patent application Ser. No. 16/239, 252, filed Jan. 3, 2019, entitled, "VIRTUALIZATION OF A RECONFIGURABLE DATA PROCESSOR,";

U.S. Nonprovisional patent application Ser. No. 16/197, 826, filed Nov. 21, 2018, entitled, "CONFIGURATION LOAD OF A RECONFIGURABLE DATA PROCESSOR,";

U.S. Nonprovisional patent application Ser. No. 16/198, 086, filed Nov. 21, 2018, entitled, "CONFIGURATION UNLOAD OF A RECONFIGURABLE DATA PROCESSOR,";

U.S. Nonprovisional patent application Ser. No. 16/260, 548, filed Jan. 29, 2019, entitled, "MATRIX NORMAL/TRANSPOSE READ AND A RECONFIGURABLE DATA PROCESSOR INCLUDING SAME,";

U.S. Nonprovisional patent application Ser. No. 16/536, 192, filed Aug. 8, 2019, entitled, "COMPILER FLOW LOGIC FOR RECONFIGURABLE ARCHITECTURES,";

U.S. Nonprovisional patent application Ser. No. 16/407, 675, filed May 9, 2019, entitled, "CONTROL FLOW BARRIER AND RECONFIGURABLE DATA PROCESSOR,";

U.S. Nonprovisional patent application Ser. No. 16/504, 627, filed Jul. 8, 2019, entitled, "QUIESCE RECONFIGURABLE DATA PROCESSOR,";

U.S. Nonprovisional patent application Ser. No. 16/572, 516, filed Sep. 16, 2019, entitled, "EFFICIENT EXECUTION OF OPERATION UNIT GRAPHS ON RECONFIGURABLE ARCHITECTURES BASED ON USER SPECIFICATION,";

U.S. Nonprovisional patent application Ser. No. 16/744, 077, filed Jan. 15, 2020, entitled, "COMPUTATIONALLY EFFICIENT SOFTMAX LOSS GRADIENT BACKPROPAGATION,";

U.S. Nonprovisional patent application Ser. No. 16/590, 058, filed Oct. 1, 2019, entitled, "COMPUTATION UNITS FOR FUNCTIONS BASED ON LOOKUP TABLES,";

U.S. Nonprovisional patent application Ser. No. 16/695, 138, filed Nov. 25, 2019, entitled, "COMPUTATION UNITS FOR BATCH NORMALIZATION,";

U.S. Nonprovisional patent application Ser. No. 16/688, 069, filed Nov. 19, 2019, entitled, "LOOK-UP TABLE WITH INPUT OFFSETTING,";

U.S. Nonprovisional patent application Ser. No. 16/718, 094, filed Dec. 17, 2019, entitled, "COMPUTATION UNITS FOR ELEMENT APPROXIMATION,";

U.S. Nonprovisional patent application Ser. No. 16/560, 057, filed Sep. 4, 2019, entitled, "SIGMOID FUNCTION IN HARDWARE AND A RECONFIGURABLE DATA PROCESSOR INCLUDING SAME,";

U.S. Nonprovisional patent application Ser. No. 16/572, 527, filed Sep. 16, 2019, entitled, "PERFORMANCE ESTIMATION-BASED RESOURCE ALLOCATION FOR RECONFIGURABLE ARCHITECTURES,";

U.S. Nonprovisional patent application Ser. No. 15/930, 381, filed May 12, 2020, entitled, "COMPUTATIONALLY EFFICIENT GENERAL MATRIX-MATRIX MULTIPLICATION (GeMM),";

U.S. Nonprovisional patent application Ser. No. 16/890, 841, filed Jun. 2, 2020, entitled, "ANTI-CONGESTION FLOW CONTROL FOR RECONFIGURABLE PROCESSORS,";

U.S. Nonprovisional patent application Ser. No. 16/922, 975, filed Jul. 7, 2020, entitled, "RUNTIME VIRTUALIZATION OF RECONFIGURABLE DATAFLOW RESOURCES,"; and US Nonprovisional patent application Ser. No. 16/996,66, filed Aug. 18, 2020, entitled, "RUNTIME PATCHING OF CONFIGURATION FILES,".

FIELD OF THE TECHNOLOGY DISCLOSED

The present technology relates to compile time detection of streaming compatible and broadcast compatible data access patterns, which can be particularly applied to coarse-grained reconfigurable architectures (CGRAs).

BACKGROUND

The subject matter discussed in this section should not be assumed to be prior art merely as a result of its mention in this section. Similarly, a problem mentioned in this section or associated with the subject matter provided as background should not be assumed to have been previously recognized in the prior art. The subject matter in this section merely represents different approaches, which in and of themselves can also correspond to implementations of the claimed technology.

Reconfigurable processors, including field programmable gate arrays (FPGAs), can be configured to implement a variety of functions more efficiently or faster than might be achieved using a general purpose processor executing a computer program. So-called coarse-grained reconfigurable architectures (CGRAs) are being developed in which the configurable units in the array are more complex than used in typical, more fine-grained FPGAs, and may enable faster or more efficient execution of various classes of functions. For example, CGRAs have been proposed that can enable implementation of energy-efficient accelerators for machine learning and artificial intelligence workloads. See, Prabhakar, et al., "Plasticine: A Reconfigurable Architecture for Parallel Patterns," ISCA '17, Jun. 24-28, 2017, Toronto, ON, Canada.

In spatial architectures like FPGAs and CGRAs, multiple high-level operators or kernels, can be instantiated at the same time in space to operate in parallel or pipeline parallel fashion. In this kernel-based approach, individual operations have inputs and outputs at the level of individual tensors. While a trivial design for these kernels is to have each kernel provide a single memory buffer to hold each input and output tensor in its entirety, this solution does not typically provide the best utilization of physical memory resources. For example, if two sequential tensor operations like element-wise addition and element-wise hyperbolic tangent (Tanh) are implemented as kernels with the same throughput, these can be instantiated without any intermediate buffers, as one can directly feed the other. This optimization is akin to loop-fusion in hardware. Instead, it is preferred to use kernel implementations which "stream" their inputs and outputs as much as possible and rely on buffers to be set up only when necessary.

In order to maximize operating efficiency and data transmission between processing elements on a reconfigurable processor, a buffer insertion means of streaming and broadcasting data between the processing elements is needed.

SUMMARY

A technology is described which enables compile time detection of streaming compatible and broadcast compatible data access patterns in Coarse-Grained Reconfigurable Array processors that contain programmable elements in an array partitionable into subarrays, and other types of reconfigurable processors (e.g., FPGAs).

A data processing system is described. The data processing system comprises memory and compile time logic. The memory stores a dataflow graph for an application. The dataflow graph has operation units that are configured to be producers to produce tensors for execution of the application, and to be consumers to consume the tensors for execution of the application. The memory also stores write access patterns of the producers, and read access patterns of the consumers. A write access pattern of a particular producer specifies an order in which the particular producer generates elements of a tensor. A read access pattern of a corresponding consumer specifies an order in which the corresponding consumer processes the elements of the tensor. The compile time logic has access to the memory and configured to process the dataflow graph to detect conflicts between certain ones of the producers and corresponding ones of the consumers that have mismatches between the write access patterns and the read access patterns. A conflict occurs when the order in which the particular producer generates the elements of the tensor is different from the order in which the corresponding consumer processes the elements of the tensor. The compile time logic is configured to resolve the conflicts by inserting buffers between the certain ones of the producers and the corresponding ones of the consumers.

In one implementation, the certain ones of the producers are configured to write elements of the tensors in the buffers in accordance with the write access patterns. In some implementations, the corresponding ones of the consumers are configured to read the elements of the tensors from the buffers in accordance with the read access patterns.

In one implementation, the compile time logic is further configured to detect a group of corresponding consumers that have a same read access pattern for processing the elements of the tensor. In some implementations, the compile time logic is further configured to insert a single buffer between the group of corresponding consumers and the particular producer. In one implementation, the particular producer is configured to write the elements of the tensor in the single buffer in accordance with the write access pattern. In some implementations, consumers in the group of corresponding consumers are configured to read the elements of the tensor from the single buffer in accordance with the read access pattern.

In one implementation, the write access patterns and the read access patterns are defined based on operation types implemented by the operation units.

In one implementation, the compile time logic is further configured to generate a modified version of the dataflow graph with buffers inserted between the certain ones of the producers and the corresponding ones of the consumers. In some implementations, runtime logic is configured to allocate physical compute units and physical memory units of a reconfigurable processor to the modified version of the dataflow graph. In other implementations, the runtime logic is configured to execute the modified version of the dataflow graph on the reconfigurable processor based on the allocation.

In one implementation, a computer-implemented method is described. The method includes storing a dataflow graph for an application, the dataflow graph having operation units that are configured to be producers to produce tensors for execution of the application, and to be consumers to consume the tensors for execution of the application. The method further includes storing write access patterns of the producers, and read access patterns of the consumers. A write access pattern of a particular producer specifies an order in which the particular producer generates elements of a tensor, and a read access pattern of a corresponding consumer specifies an order in which the corresponding consumer processes the elements of the tensor. The method further includes detecting conflicts between certain ones of the producers and corresponding ones of the consumers that have mismatches between the write access patterns and the read access patterns. A conflict occurs when the order in which the particular producer generates the elements of the tensor is different from the order in which the corresponding consumer processes the elements of the tensor. The method further includes resolving the conflicts by inserting buffers between the certain ones of the producers and the corresponding ones of the consumers.

One or more implementations of the technology disclosed or elements thereof can be implemented in the form of a computer product including a non-transitory computer readable storage medium with computer usable program code for performing the method steps indicated. Furthermore, one or more implementations of the technology disclosed or elements thereof can be implemented in the form of an apparatus including a memory and at least one processor that is coupled to the memory and operative to perform exemplary method steps. Yet further, in another aspect, one or more implementations of the technology disclosed or elements thereof can be implemented in the form of means for carrying out one or more of the method steps described herein; the means can include (i) hardware module(s), (ii) software module(s) executing on one or more hardware processors, or (iii) a combination of hardware and software modules; any of (i)-(iii) implement the specific techniques set forth herein, and the software modules are stored in a computer readable storage medium (or multiple such media).

These and other features, aspects, and advantages of the technology disclosed will become apparent from the following detailed description of illustrative implementations thereof, which is to be read in connection with the accompanying drawings.

BRIEF DESCRIPTION OF THE DRAWINGS

In the drawings, like reference characters generally refer to like parts throughout the different views. Also, the drawings are not necessarily to scale, with an emphasis instead generally being placed upon illustrating the principles of the technology disclosed. In the following description, various implementations of the technology disclosed are described with reference to the following drawings, in which.

FIG. 7 shows an example data structure that maintains producer-to-consumer mappings, and classification of the consumers as streaming compatible or broadcast compatible.

FIG. 13 depicts one implementation of a computer-implemented method of compile time detection of streaming compatible and broadcast compatible data access patterns.

DETAILED DESCRIPTION

The following discussion is presented to enable any person skilled in the art to make and use the technology disclosed and is provided in the context of a particular application and its requirements. Various modifications to the disclosed implementations will be readily apparent to those skilled in the art, and the general principles defined herein may be applied to other implementations and applications without departing from the spirit and scope of the technology disclosed. Thus, the technology disclosed is not intended to be limited to the implementations shown but is to be accorded the widest scope consistent with the principles and features disclosed herein.

Figure 1:
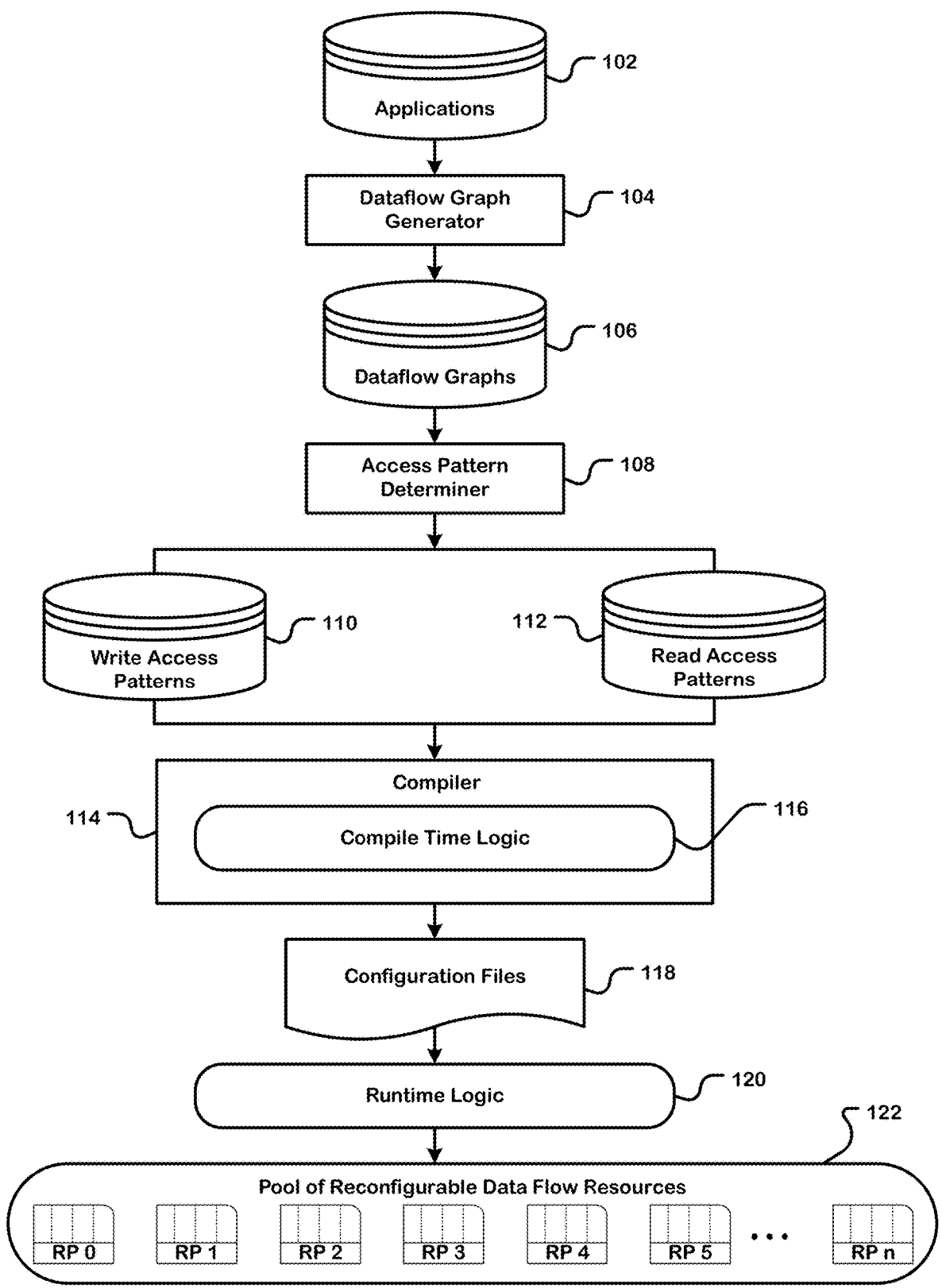
FIG. 1 shows one implementation of compile time detection of streaming compatible and broadcast compatible data access patterns, according to the technology disclosed.
Figure 2:
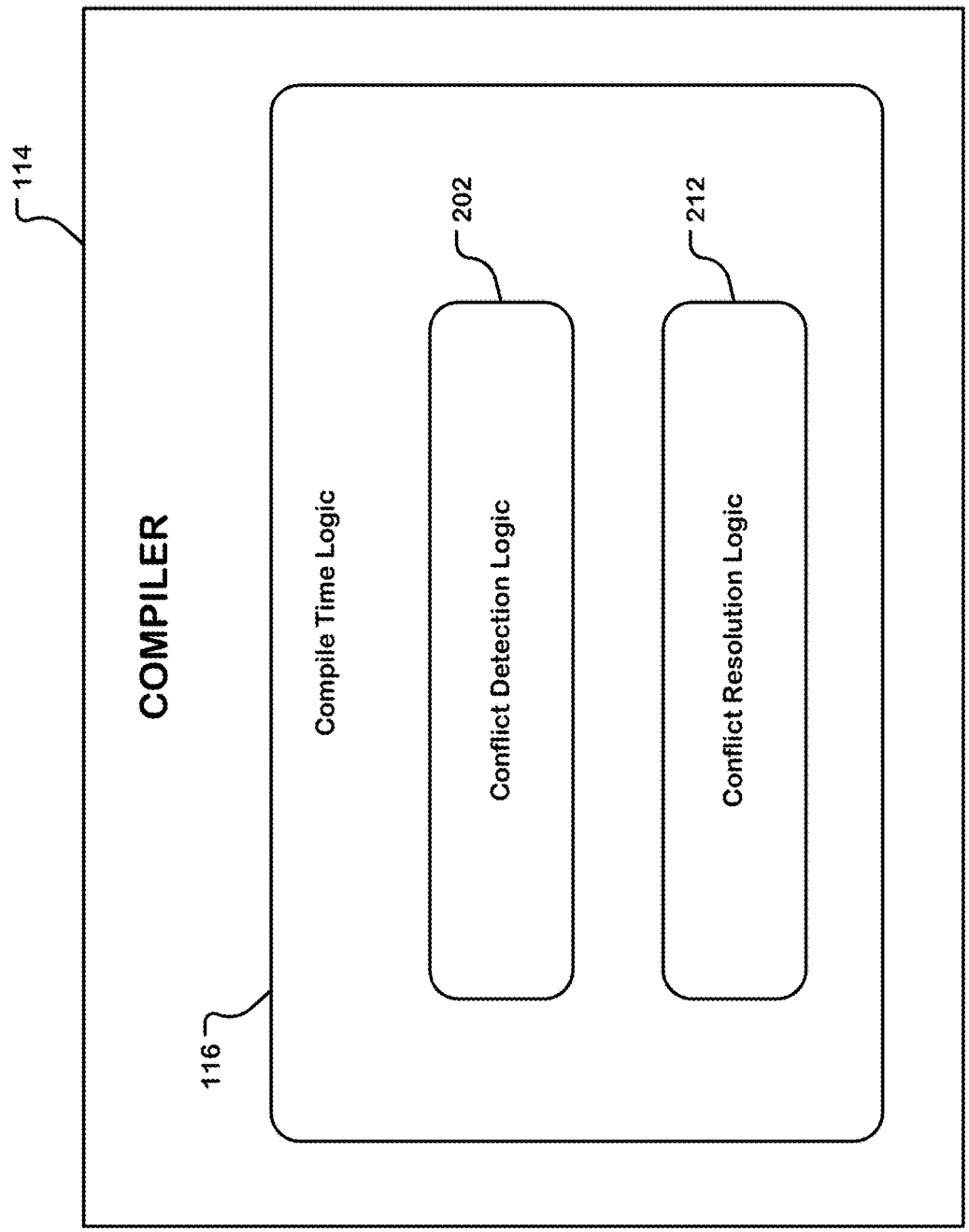
FIG. 2 depicts a heuristics diagram of compile time logic that detects conflicts due to broadcast compatible data access patterns, and resolves the conflicts by inserting buffers.

FIG. 1 shows one implementation of compile time detection of streaming compatible and broadcast compatible data access patterns, according to the technology disclosed. Reconfigurable dataflow resources in the pool of reconfigurable dataflow resources 122 include reconfigurable processors. A reconfigurable processor includes an array of configurable units (e.g., compute units and memory units) in a programmable interconnect fabric. The array of configurable units in a reconfigurable processor is partitionable into a plurality of subarrays (or tiles) of configurable units.

Additional details about the architecture of the reconfigurable processors are discussed later in FIGS. 8, 9, 10, 10B, 11, and 12.

The pool of reconfigurable dataflow resources 122 also includes bus resources (or transfer resources). Examples of the bus resources include PCIe channels, DMA channels, and DDR channels. The pool of reconfigurable dataflow resources 122 also includes memory resources (or storage resources). Examples of the memory resources include main memory (e.g., off-chip/external DRAM), local secondary storage (e.g., local disks (e.g., HDD, SSD)), and remote secondary storage (e.g., distributed file systems, web servers). Other examples of the memory resources include latches, registers, and caches (e.g., SRAM). The pool of reconfigurable dataflow resources 122 is dynamically scalable to meet the performance objectives required by applications 102 (or user applications 102). The applications 102 access the pool of reconfigurable dataflow resources 122 over one or more networks (e.g., Internet).

In some implementations, different compute scales and hierarchies form the pool of reconfigurable dataflow resources 122 according to different implementations of the technology disclosed. In one example, the pool of reconfigurable dataflow resources 122 is a node (or a single machine) that runs a plurality of reconfigurable processors, supported by required bus and memory resources. The node also includes a host processor (e.g., CPU) that exchanges data with the plurality of reconfigurable processors, for example, over a PCIe interface. The host processor includes a runtime processor that manages resource allocation, memory mapping, and execution of the configuration files for applications requesting execution from the host processor. In another example, the pool of reconfigurable dataflow resources 122 is a rack (or cluster) of nodes, such that each node in the rack runs a respective plurality of reconfigurable processors, and includes a respective host processor configured with a respective runtime processor. The runtime processors are distributed across the nodes and communicate with each other so that they have unified access to the reconfigurable processors attached not only to their own node on which they run, but also to the reconfigurable processors attached to every other node in the data center.

The nodes in the rack are connected, for example, over Ethernet or InfiniBand (IB). In yet another example, the pool of reconfigurable dataflow resources 122 is a pod that comprises a plurality of racks. In yet another example, the pool of reconfigurable dataflow resources 122 is a superpod that comprises a plurality of pods. In yet another example, the pool of reconfigurable dataflow resources 122 is a zone that comprises a plurality of superpods. In yet another example, the pool of reconfigurable dataflow resources 122 is a data center that comprises a plurality of zones.

The applications 102 are executed on the reconfigurable processors in a distributed fashion by programming the individual compute and memory components to asynchronously receive, process, and send data and control information. In the reconfigurable processors, computation can be executed as deep, nested dataflow pipelines that exploit nested parallelism and data locality very efficiently. These dataflow pipelines contain several stages of computation, where each stage reads data from one or more input buffers with an irregular memory access pattern, performs computations on the data while using one or more internal buffers to store and retrieve intermediate results, and produces outputs that are written to one or more output buffers. The structure of these pipelines depends on the control and dataflow graph representing the application. Pipelines can be arbitrarily nested and looped within each other.

The applications 102 comprise high-level programs. A high-level program is source code written in programming languages like C, C++, Java, JavaScript, Python, and Spatial, for example, using deep learning frameworks like PyTorch, TensorFlow, ONNX, Caffe, and Keras. The high-level program can implement computing structures and algorithms of machine learning models like AlexNet, VGG Net, GoogleNet, ResNet, ResNeXt, RCNN, YOLO, SqueezeNet, SegNet, GAN, BERT, ELMo, USE, Transformer, and Transformer-XL. In one example, the high-level program can implement a convolutional neural network with several processing layers, such that each processing layer can include one or more nested loops. The high-level program can execute irregular memory operations that involve accessing inputs and weights and performing matrix multiplications between the inputs and the weights. The high-level program can include nested loops with high iteration count and loop bodies that load and multiply input values from a preceding processing layer with weights of a succeeding processing layer to produce an output for the succeeding processing layer. The high-level program can have loop-level parallelism of the outermost loop body, which can be exploited using coarse-grained pipelining. The high-level program can have instruction-level parallelism of the innermost loop body, which can be exploited using loop unrolling, SIMD vectorization, and pipelining.

Regarding loops in the high-level programs of the applications 102, loops directly nested in a loop body are termed the child loops of the outer parent loop. A loop is called an innermost loop if it does not have any children, i.e., there are no nested loops within its body. A loop is an outermost loop if it does not have a parent, i.e., it is not nested within another loop's body. An imperfectly nested loop has a body with a mix of non-looping statements (e.g., primitive arithmetic, logical, and relational operations) and one or more child loops. Parallelism in the imperfectly nested loops can be exploited at any or all loop levels, and in the operations that comprise loop bodies. Parallelism can occur in multiple forms such as fine-grained and coarse-grained pipeline parallelism, data parallelism, and task parallelism.

In some implementations, a software development kit (SDK) (or dataflow graph generator 104) generates dataflow graphs 106 of the high-level programs of the applications 102. The SDK transforms the input behavioral description of the high-level programs into an intermediate representation such as the dataflow graphs 106. This may include code optimization steps like false data dependency elimination, dead-code elimination, and constant folding. The dataflow graphs 106 encode the data and control dependencies of the high-level programs.

The dataflow graphs 106 comprise nodes and edges. The nodes can represent compute operations and memory allocations. The edges can represent data flow and control flow. In some implementations, each loop in the high-level programs can be represented as a controller in the dataflow graphs 106. The dataflow graphs 106 support branches, loops, function calls, and other variations of control dependencies. In some implementations, after the dataflow graphs 106 are generated, additional analyses or optimizations focused on loop transformations can be performed, such as loop unrolling, loop pipelining, loop fission/fusion, and loop tiling.

The SDK also supports programming the reconfigurable processors in the pool of reconfigurable dataflow resources 122 at multiple levels, for example, from the high-level deep learning frameworks to C++ and assembly language. In some implementations, the SDK allows programmers to develop code that runs directly on the reconfigurable processors. In other implementations, the SDK provides libraries that contain predefined functions like linear algebra operations, element-wise tensor operations, non-linearities, and reductions required for creating, executing, and profiling the dataflow graphs 106 on the reconfigurable processors. The SDK communicates with the deep learning frameworks via application programming interfaces (APIs).

The nodes in a dataflow graph represent operation units that are configured to be producers to produce tensors for execution of an application, and to be consumers to consume the tensors for execution of the application. The producers and consumers asynchronously transmit data along data connections. A tensor includes one or more vectors. An access pattern determiner 108 determines a data access pattern for each operation unit in the dataflow graph. The data access pattern of an operation unit is defined by an operation type implemented by the operation unit. A write access pattern of a particular producer specifies an order in which the particular producer generates elements of a tensor. A read access pattern of a corresponding consumer specifies an order in which the corresponding consumer processes the elements of the tensor. Write access patterns 110 of the producers and read access patterns 112 of the consumers are stored in memory, and span all known operations like non-linearities such as rectified linear unit (ReLU) and its variants (e.g., leaky ReLU), hyperbolic tangent (tanh), sigmoid, softmax, etc., element-wise addition, matrix multiplication (e.g., general matrix multiply (GeMM), layer normalization (e.g., batch normalization), loss functions like cross-entropy, tensor shape modifiers like transpose, and so on.

A compiler 114 transforms the dataflow graphs 106 into a hardware-specific configuration, which is specified in an execution file generated by the compiler 114. In one implementation, the compiler 114 partitions the dataflow graphs 106 into memory allocations and execution fragments, and these partitions are specified in the execution file. Execution fragments represent operations on data. An execution fragment can comprise portions of a program representing an amount of work. An execution fragment can comprise computations encompassed by a set of loops, a set of graph nodes, or some other unit of work that requires synchronization. An execution fragment can comprise a fixed or variable amount of work, as needed by the program. Different ones of the execution fragments can contain different amounts of computation. Execution fragments can represent parallel patterns or portions of parallel patterns and are executable asynchronously.

In some implementations, the partitioning of the dataflow graphs 106 into the execution fragments includes treating calculations within at least one innermost loop of a nested loop of the dataflow graphs 106 as a separate execution fragment. In other implementations, the partitioning of the dataflow graphs 106 into the execution fragments includes treating calculations of an outer loop around the innermost loop of the dataflow graphs 106 as a separate execution fragment. In the case of imperfectly nested loops, operations within a loop body up to the beginning of a nested loop within that loop body are grouped together as a separate execution fragment.

Memory allocations represent the creation of logical memory spaces in on-chip and/or off-chip memories for data required to implement the dataflow graphs 106, and these memory allocations are specified in the execution file.

Memory allocations define the type and the number of hardware resources (functional units, storage, or connectivity components). Main memory (e.g., DRAM) is off-chip memory for which the memory allocations can be made. Scratchpad memory (e.g., SRAM) is on-chip memory for which the memory allocations can be made. Other memory types for which the memory allocations can be made for various access patterns and layouts include read-only lookup-tables (LUTs), fixed size queues (e.g., FIFOs), and register files.

The compiler 114 binds memory allocations to virtual memory units and binds execution fragments to virtual compute units, and these bindings are specified in the execution file. In some implementations, the compiler 114 partitions execution fragments into memory fragments and compute fragments, and these partitions are specified in the execution file. A memory fragment comprises address calculations leading up to a memory access. A compute fragment comprises all other operations in the parent execution fragment. In one implementation, each execution fragment is broken up into a plurality of memory fragments and exactly one compute fragment. In one implementation, the compiler 114 performs the partitioning using reverse dataflow analysis such that inputs to an address used in a memory access are recursively flagged until the compiler 114 reaches either constant values or (bound) loop/pattern iterators. A single execution fragment can produce one or more memory fragments, depending on how many memory accesses exist in the original loop body. In cases where the same memory addressing logic is shared across multiple memory accesses, address calculation may be duplicated to create multiple memory fragments from the same execution fragment.

The memory fragments of the execution fragments are configured to index into data structures. At least one of the memory fragments indexes into a data structure in the logical memory spaces of one of the memory allocations. Each compute and memory fragment preserves information about all loops whose loop bodies directly contain the operations in the corresponding execution fragment. In one implementation, this corresponds to replicating the calculation of the loop iterators of each loop into each compute and memory fragment. This replication allows each fragment to preserve the same iterative behavior as the original program while also allowing distributed calculation of loop iterators.

The compiler 114 assigns the memory fragments to the virtual memory units and assigns the compute fragments to the virtual compute units, and these assignments are specified in the execution file. Each memory fragment is mapped operation-wise to the virtual memory unit corresponding to the memory being accessed. Each operation is lowered to its corresponding configuration intermediate representation for that virtual memory unit. Each compute fragment is mapped operation-wise to a newly allocated virtual compute unit. Each operation is lowered to its corresponding configuration intermediate representation for that virtual compute unit.

The compiler 114 allocates the virtual memory units to physical memory units of a reconfigurable processor (e.g., pattern memory units (PMUs) of the reconfigurable processor) and allocates the virtual compute units to physical compute units of the reconfigurable processor (e.g., pattern compute units (PCUs) of the reconfigurable processor), and these allocations are specified in the execution file. The compiler 114 places the physical memory units and physical compute units onto positions in an array of configurable units of the reconfigurable processor and routes data and control networks between the placed positions, and these placements and routes are specified in the execution file. In one implementation, this includes allocating physical resources such as counters and registers within each physical memory and compute unit, and these allocations are specified in the execution file.

The compiler 114 translates the applications 102 developed with commonly used open-source packages such as Keras and PyTorch into reconfigurable processor specifications. The compiler 114 generates the configuration files 118 with configuration data for the placed positions and the routed data and control networks. In one implementation, this includes assigning coordinates and communication resources of the physical memory and compute units by placing and routing units onto the array of the processor while maximizing bandwidth and minimizing latency.

The compiler 114 comprises compile time logic 116. The compile time logic 116 further comprises conflict detection logic 202 and conflict resolution logic 212. The conflict detection logic 202 detects conflicts between certain ones of the producers and corresponding ones of the consumers that have mismatches between the write access patterns and the read access patterns. A conflict occurs when the order in which the particular producer generates the elements of the tensor is different from the order in which the corresponding consumer processes the elements of the tensor. The conflict resolution logic 212 resolves the conflicts by inserting buffers between the certain ones of the producers and the corresponding ones of the consumers. The inserted buffers are logical buffers. The logical buffers are allocated physical resources (e.g., physical memory units (PMUs) and physical compute units (PCUs)) in the pool of reconfigurable data flow resources 122. In some implementations, a single logical buffer is allocated multiple PMUs.

Figure 3:
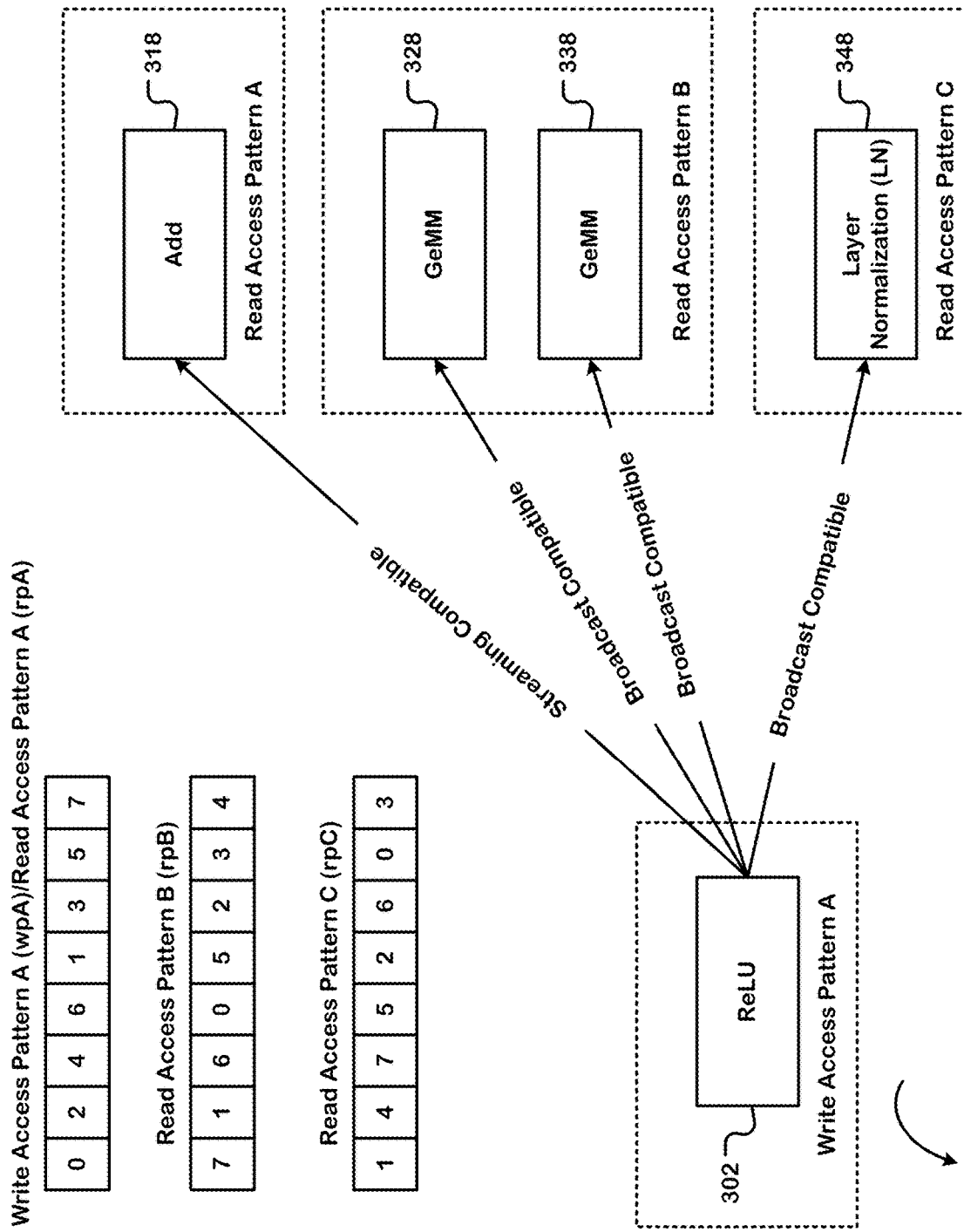
FIG. 3 portrays one example of the compile time logic parsing a dataflow graph, and classifying consumers as streaming compatible or broadcast compatible.

In FIG. 3, an example dataflow graph 300 has five operation units: rectified linear unit (ReLU) 302, element-wise addition unit (Add) 318, first matrix multiplication unit (GeMM) 328, second matrix multiplication unit (GeMM) 338, and layer normalization unit (LN) 348. A tensor processed by the dataflow graph 300 has eight vectors "0 1 2 3 4 5 6 7," and each vector is identified by its corresponding numerical index.

The conflict detection logic 202 also classifies data access patterns between the producers and the consumers as "streaming compatible" (no conflict) or "broadcast compatible" (conflict). In FIG. 3, ReLU 302 is the producer, and Add 318, GeMM 328, GeMM 338, and LN 348 are the consumers because they receive data from ReLU 302. Producer ReLU 302 has a write access pattern A (wpA), i.e., producer ReLU 302 generates the eight vectors in the order "0 2 4 6 1 3 5 7." Consumer Add 318 has a read access pattern A (rpA), which is the same as the write access pattern A, i.e., consumer Add 318 processes the eight vectors in the same order they are generated by the producer ReLU 302. Accordingly, there is no conflict between the producer ReLU 302 and the consumer Add 318, and therefore the data access pattern between them is classified as "streaming compatible."

Consumer LN 348 has a read access pattern C (rpC), i.e., consumer LN 348 processes the eight vectors in the order "1 4 7 5 2 6 0 3." Accordingly, there is a conflict between the producer ReLU 302 and the consumer LN 348, and therefore the data access pattern between them are classified as "broadcast compatible."

Both the consumers GeMM 328 and GeMM 338 have a same read access pattern B (rpB), i.e., consumers GeMM 328 and GeMM 338 respectively process the eight vectors in the order "7 1 6 0 5 2 3 4." Accordingly, there are respective conflicts between the producer ReLU 302 and the consumers GeMM 328 and GeMM 338, and therefore the respective data access patterns between them is classified as "broadcast compatible."

Figure 4:
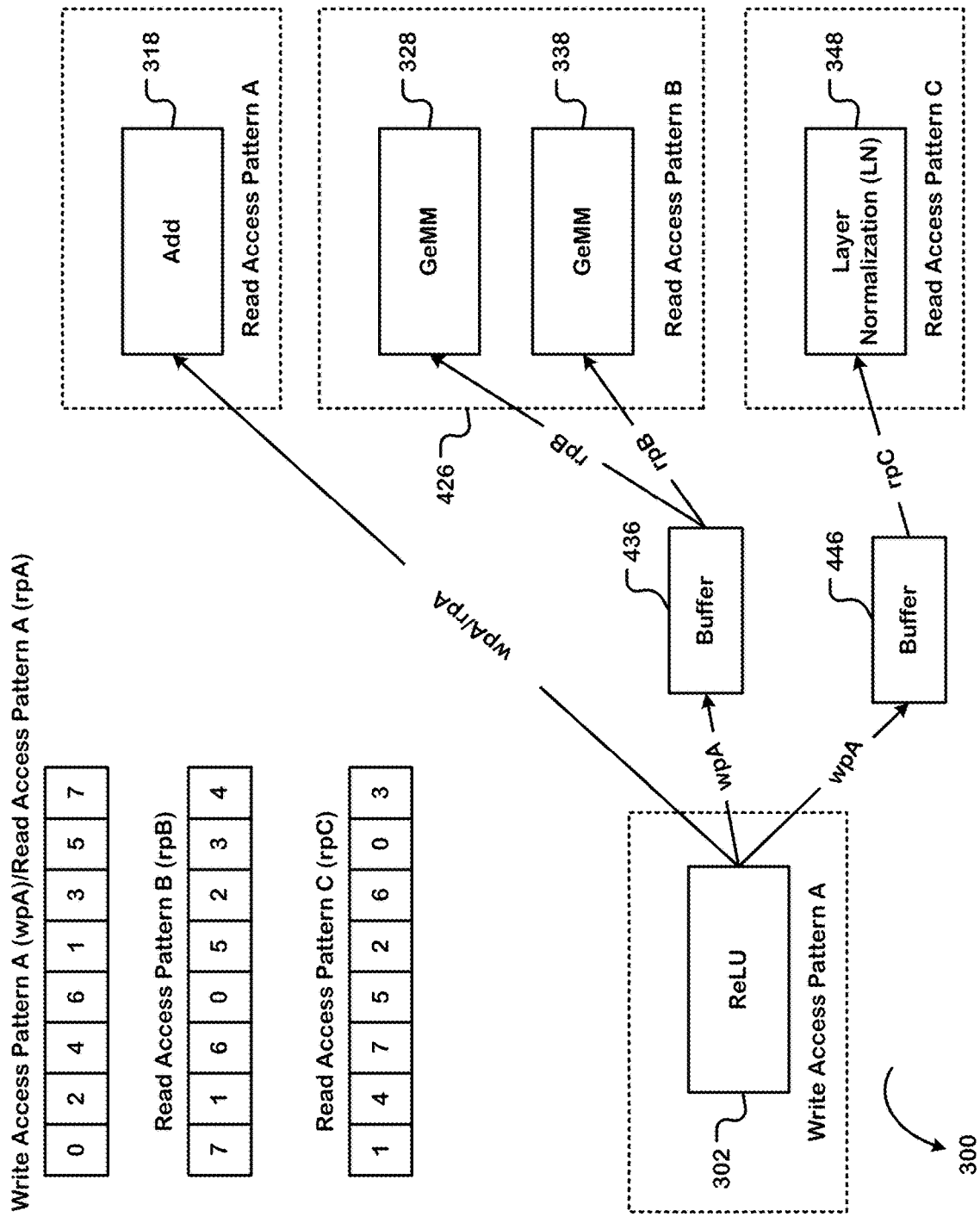
FIG. 4 illustrates one example of the compile time logic inserting buffers in the dataflow graph to resolve conflicts due to the broadcast compatible consumers.

In FIG. 4, the conflict resolution logic 212 resolves the conflicts by inserting buffers in those data access patterns that are classified as broadcast compatible. Accordingly, a buffer 446 is inserted between the producer ReLU 302 and the consumer LN 348. Once inserted, the producer ReLU 302 writes the eight vectors in the buffer 446 according to the write access pattern A (wpA), and the consumer LN 348 reads the eight vectors from the buffer 446 according to the read access pattern C (rpC).

Since the consumers GeMM 328 and GeMM 338 have the same read access pattern B (rpB), they can be considered part of a group 426. Then, the conflict resolution logic 212 inserts only a single buffer 436 between the producer ReLU 302 and the consumers GeMM 328 and GeMM 338 in the group 426. Once inserted, the producer ReLU 302 writes the eight vectors in the buffer 436 according to the write access pattern A (wpA), and the consumers GeMM 328 and GeMM 338 respectively read the eight vectors from the buffer 436 according to the read access pattern B (rpB).

Furthermore, since the data access pattern between the producer ReLU 302 and the consumer Add 318 is classified as streaming compatible, there is no conflict and therefore no requirement of conflict resolution by buffer insertion.

Figure 5:
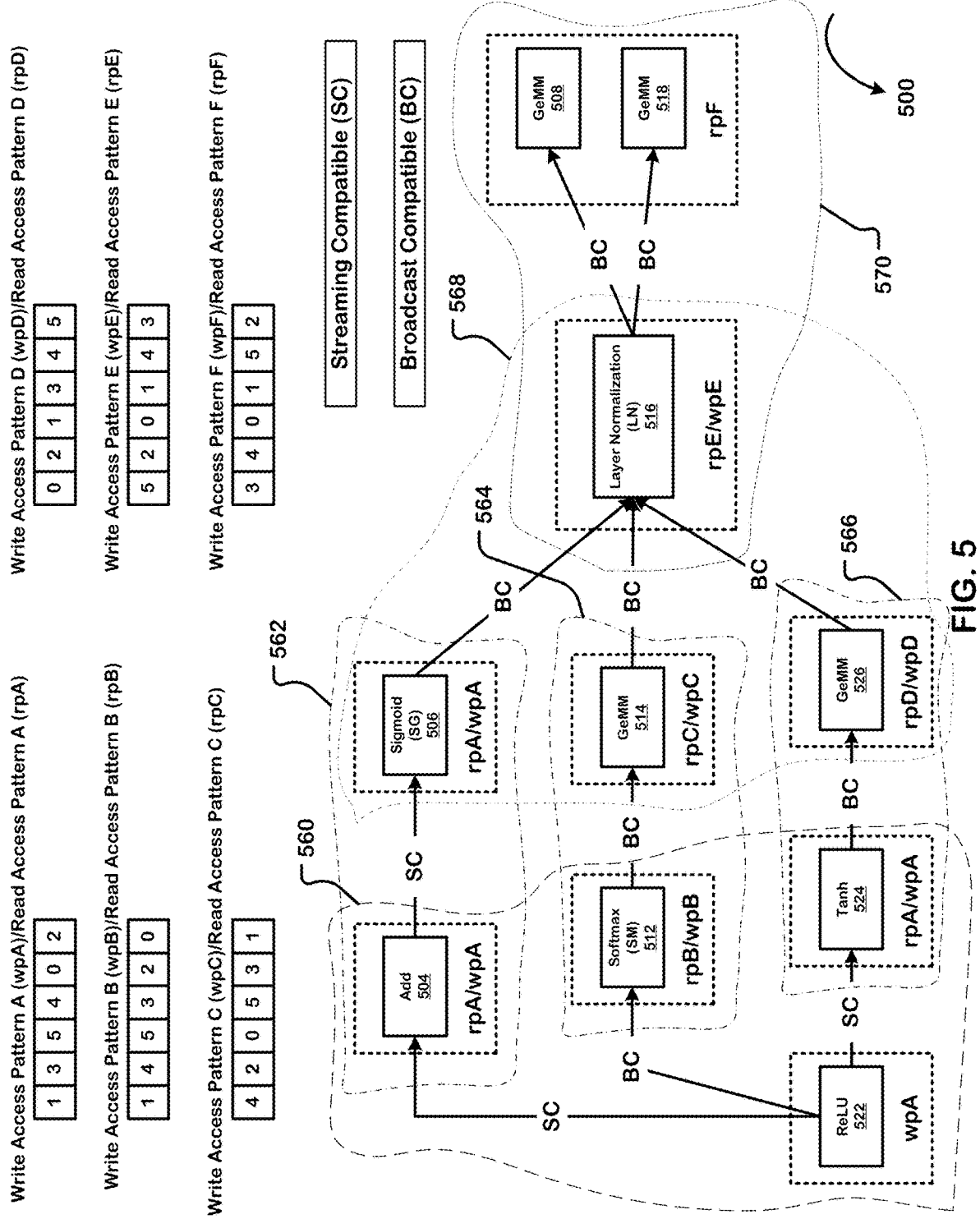
FIG. 5 portrays another example of the compile time logic parsing a dataflow graph, and classifying consumers as streaming compatible or broadcast compatible.

In FIG. 5, another example dataflow graph 500 has nine operation units: rectified linear unit (ReLU) 522, element-wise addition unit (Add) 504, softmax unit (SM) 512, hyperbolic tangent unit (Tanh) 524, sigmoid unit (SG) 506, first matrix multiplication unit (GeMM) 514, second matrix multiplication unit (GeMM) 526, layer normalization unit (LN) 516, third matrix multiplication unit (GeMM) 508, and fourth matrix multiplication unit (GeMM) 518. A tensor processed by the dataflow graph 500 has six vectors "0 1 2 3 4 5," and each vector is identified by its corresponding numerical index.

The conflict detection logic 202 also classifies data access patterns between the producers and the consumers as "streaming compatible" (no conflict) or "broadcast compatible" (conflict). In sub-graph 560, ReLU 522 is the producer, and Add 504, SM 512, and Tanh 524 are the consumers because they receive data from ReLU 522. Producer ReLU 302 has a write access pattern A (wpA), i.e., producer ReLU 302 generates the six vectors in the order "1 3 5 4 0 2." Consumers Add 504 and Tanh 524 have a read access pattern A (rpA), which is the same as the write access pattern A, i.e., consumers Add 504 and Tanh 524 process the six vectors in the same order they are generated by the producer ReLU 522. Accordingly, there is no conflict between the producer ReLU 522 and the consumers Add 504 and Tanh 524, and therefore the data access pattern between them is classified as "streaming compatible."

In the sub-graph 560, consumer SM 512 has a read access pattern B (rpB), i.e., consumer SM 512 processes the six vectors in the order "1 4 5 3 2 0." Accordingly, there is a conflict between the producer ReLU 302 and the consumer SM 512, and therefore the data access pattern between them is classified as "broadcast compatible."

In sub-graph 562, Add 504 is the producer, and SG 506 is the consumer because SG 506 receives data from Add 504. Producer Add 504 has a write access pattern A (wpA), i.e., producer Add 504 generates the six vectors in the order "1 3 5 4 0 2." Consumer SG 506 has a read access pattern A (rpA), which is the same as the write access pattern A, i.e., consumer SG 506 processes the six vectors in the same order they are generated by the producer Add 504. Accordingly, there is no conflict between the producer Add 504 and the consumer SG 506, and therefore the data access pattern between them is classified as "streaming compatible."

In sub-graph 564, SM 512 is the producer, and GeMM 514 is the consumer because GeMM 514 receives data from SM 512. Producer SM 512 has a write access pattern B (wpB), i.e., producer SM 512 generates the six vectors in the order "1 4 5 3 2 0." However, the consumer GeMM 514 has a read access pattern C (rpC), i.e., consumer GeMM 514 processes the six vectors in the order "4 2 0 5 3 1." Accordingly, there is a conflict between the producer SM 512 and the consumer GeMM 514, and therefore the data access pattern between them is classified as "broadcast compatible."

In sub-graph 566, Tanh 524 is the producer, and GeMM 526 is the consumer because GeMM 526 receives data from Tanh 524. Producer Tanh 524 has a write access pattern A (wpA), i.e., producer Add 504 generates the six vectors in the order "1 3 5 4 0 2." However, the consumer GeMM 526 has a read access pattern D (rpD), i.e., consumer GeMM 526 processes the six vectors in the order "0 2 1 3 4 5." Accordingly, there is a conflict between the producer Tanh 524 and the consumer GeMM 526, and therefore the data access pattern between them is classified as "broadcast compatible."

In sub-graph 568, there are three producers SG 506, GeMM 514, and GeMM 526, and one consumer LN 516. Producer SG 506 has a write access pattern A (wpA), i.e., producer SG 506 generates the six vectors in the order "1 3 5 4 0 2." Producer GeMM 514 has a write access pattern C (wpC), i.e., producer GeMM 514 generates the six vectors in the order "0 2 1 3 4 5." Producer GeMM 526 has a write access pattern D (wpD), i.e., producer GeMM 526 generates the six vectors in the order "0 2 1 3 4 5." However, the consumer LN 516 has a read access pattern E (rpE), i.e., consumer LN 516 processes the six vectors in the order "5 2 0 1 4 3." Accordingly, there are respective conflicts between the consumer LN 516 and each of the producers SG 506, GeMM 514, and GeMM 526, and therefore the respective data access patterns between them are classified as "broadcast compatible."

In sub-graph 570, LN 516 is the producer, and GeMM 508 and 518 are the consumers. Both the consumers GeMM 508 and GeMM 518 have a same read access pattern F (rpF), i.e., consumers GeMM 508 and GeMM 518 respectively process the six vectors in the order "3 4 0 1 5 2." Accordingly, there are respective conflicts between the producer LN 516 and the consumers GeMM 508 and GeMM 518, and therefore the respective data access patterns between them are classified as "broadcast compatible."

Figure 6:
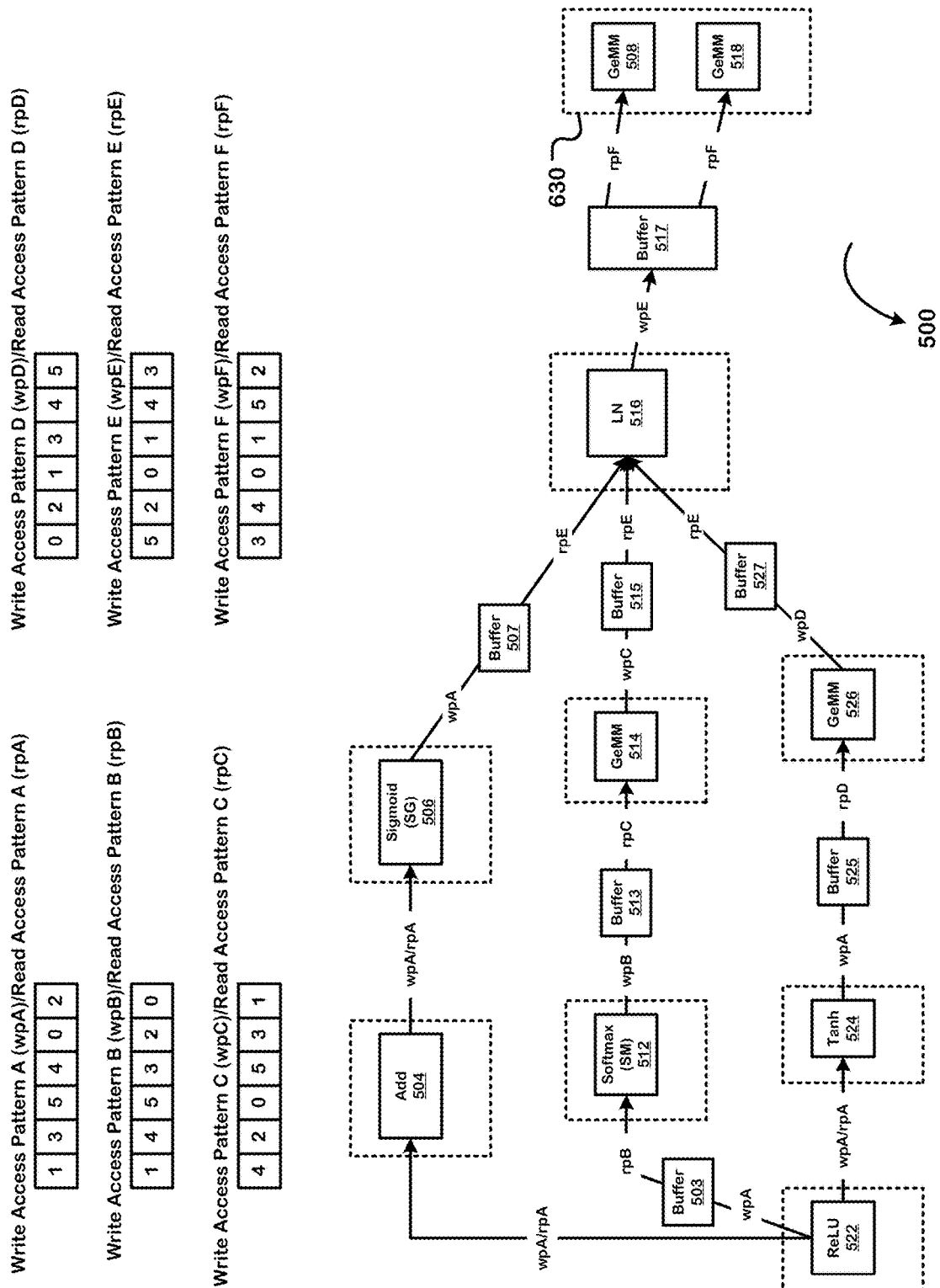
FIG. 6 illustrates another example of the compile time logic inserting buffers in the dataflow graph to resolve conflicts due to the broadcast compatible consumers.

In FIG. 6, the conflict resolution logic 212 resolves the conflicts by inserting buffers in those data access patterns that are classified as broadcast compatible. Accordingly, a buffer 503 is inserted between the producer ReLU 522 and the consumer SM 512. Once inserted, the producer ReLU 522 writes the six vectors in the buffer 503 according to the write access pattern A (wpA), and the consumer SM 512 reads the six vectors from the buffer 503 according to the read access pattern B (rpB).

Similarly, a buffer 513 is inserted between the producer SM 512 and the consumer GeMM 514. Once inserted, the producer SM 512 writes the six vectors in the buffer 513 according to the write access pattern B (wpB), and the consumer GeMM 514 reads the six vectors from the buffer 513 according to the read access pattern C (rpC).

Similarly, a buffer 525 is inserted between the producer Tanh 524 and the consumer GeMM 526. Once inserted, the producer Tanh 524 writes the six vectors in the buffer 525 according to the write access pattern A (wpA), and the consumer GeMM 526 reads the six vectors from the buffer 525 according to the read access pattern D (rpD).

Similarly, a buffer 507 is inserted between the producer SG 506 and the consumer LN 516. Once inserted, the producer SG 506 writes the six vectors in the buffer 507 according to the write access pattern A (wpA), and the consumer LN 516 reads the six vectors from the buffer 507 according to the read access pattern E (rpE).

Similarly, a buffer 515 is inserted between the producer GeMM 514 and the consumer LN 516. Once inserted, the producer GeMM 514 writes the six vectors in the buffer 515 according to the write access pattern C (wpC), and the consumer LN 516 reads the six vectors from the buffer 515 according to the read access pattern E (rpE).

Similarly, a buffer 527 is inserted between the producer GeMM 526 and the consumer LN 516. Once inserted, the producer GeMM 526 writes the six vectors in the buffer 527 according to the write access pattern D (wpD), and the consumer LN 516 reads the six vectors from the buffer 527 according to the read access pattern E (rpE).

Since the consumers GeMM 508 and GeMM 518 have the same read access pattern F (rpF), they can be considered part of a group 630. Then, the conflict resolution logic 212 inserts only a single buffer 517 between the producer LN 516 and the consumers GeMM 508 and GeMM 518 in the group 630. Once inserted, the producer LN 516 writes the six vectors in the buffer 517 according to the write access pattern E (wpE), and the consumers GeMM 508 and GeMM 518 respectively read the six vectors from the buffer 517 according to the read access pattern E (rpE).

Furthermore, since the respective data access patterns between the producer ReLU 522 and the consumers Add 504 and Tanh 524, and the producer Add 504 and the consumer SG 506 are classified as streaming compatible, there is no conflict and therefore no requirement of conflict resolution by buffer insertion.

FIG. 7 shows an example data structure 700 that maintains producer-to-consumer mappings, and classification of the consumers as streaming compatible or broadcast compatible. The data structure 700 has a column 702 identifying the respective producers in the different sub-graphs 560, 562, 564, 566, 568, and 570. The data structure 700 has a column 712 identifying the respective write access patterns of the producers in the different sub-graphs 560, 562, 564, 566, 568, and 570. The data structure 700 has a column 722 identifying the respective consumers in the different sub-graphs 560, 562, 564, 566, 568, and 570. The data structure 700 has a column 732 identifying the respective read access patterns of the consumers in the different sub-graphs 560, 562, 564, 566, 568, and 570. The data structure 700 has a column 742 identifying the classification of the respective consumers in the different sub-graphs 560, 562, 564, 566, 568, and 570 as streaming compatible or broadcast compatible.

In some implementations, runtime logic 120 is configured to allocate physical compute units and physical memory units of a reconfigurable processor in the pool of reconfigurable data flow resources 122 to the modified version of the dataflow graph. In other implementations, the runtime logic 120 is configured to execute the modified version of the dataflow graph on the reconfigurable processor based on the allocation.

Figure 8:
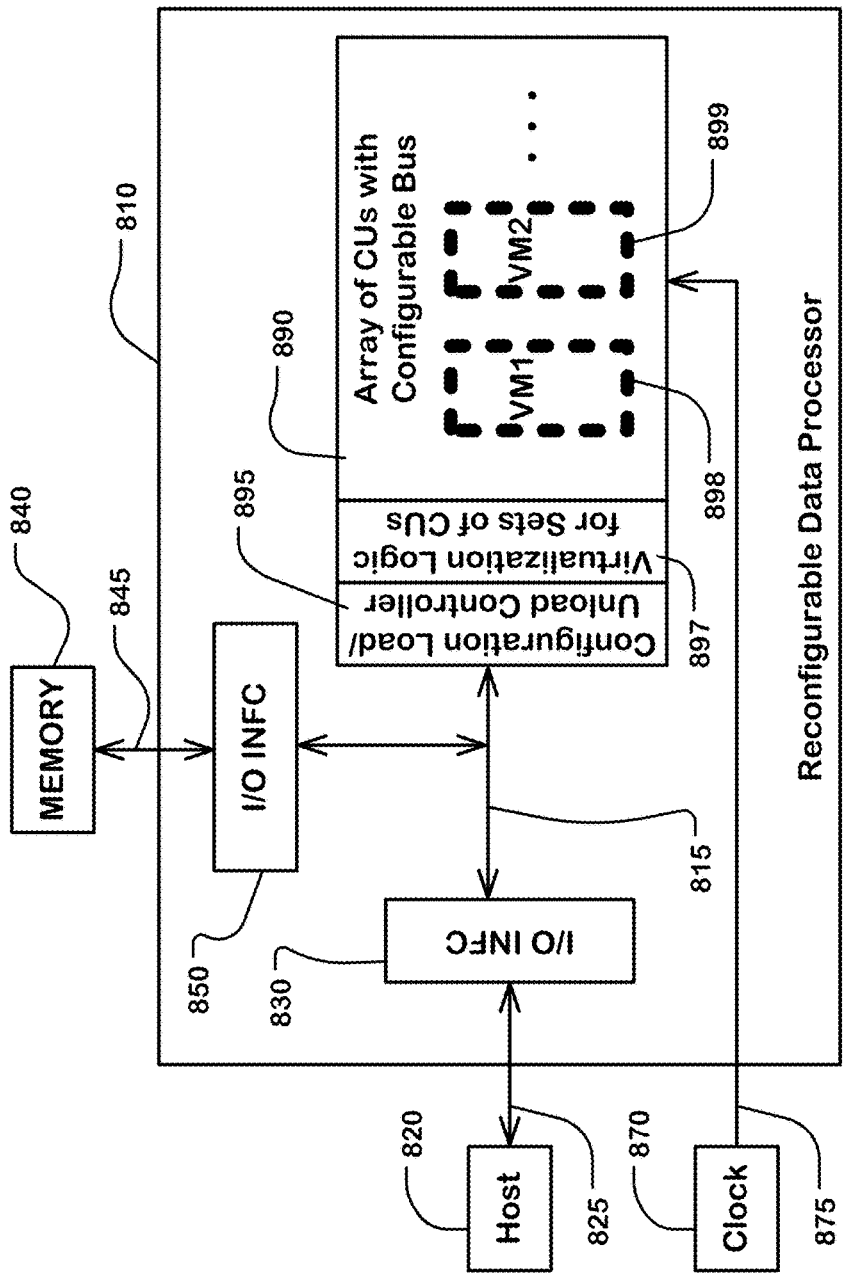
FIG. 8 is a system diagram illustrating a system including a host, a memory, and a reconfigurable data processor.

FIG. 8 is a diagram illustrating a system 800 including a host 820, a memory 840, and a reconfigurable data processor 810 in which a computation unit as described herein is deployed by hardware or by configuration of reconfigurable components and configured with the virtualization logic 897. As shown in the example of FIG. 8, the reconfigurable data processor 810 includes an array 890 of configurable units and a configuration load/unload controller 895.

The virtualization logic 897 can include resources that support or enable simultaneous execution of multiple, unrelated application graphs (or related ones) in an array of configurable units on one die or one multichip module. In the illustration, a first application graph is implemented in virtual machine VM1 in a particular set 898 of configurable units, and a second application graph is implemented in virtual machine VM2 in another set 899 of configurable units.

Figure 11:
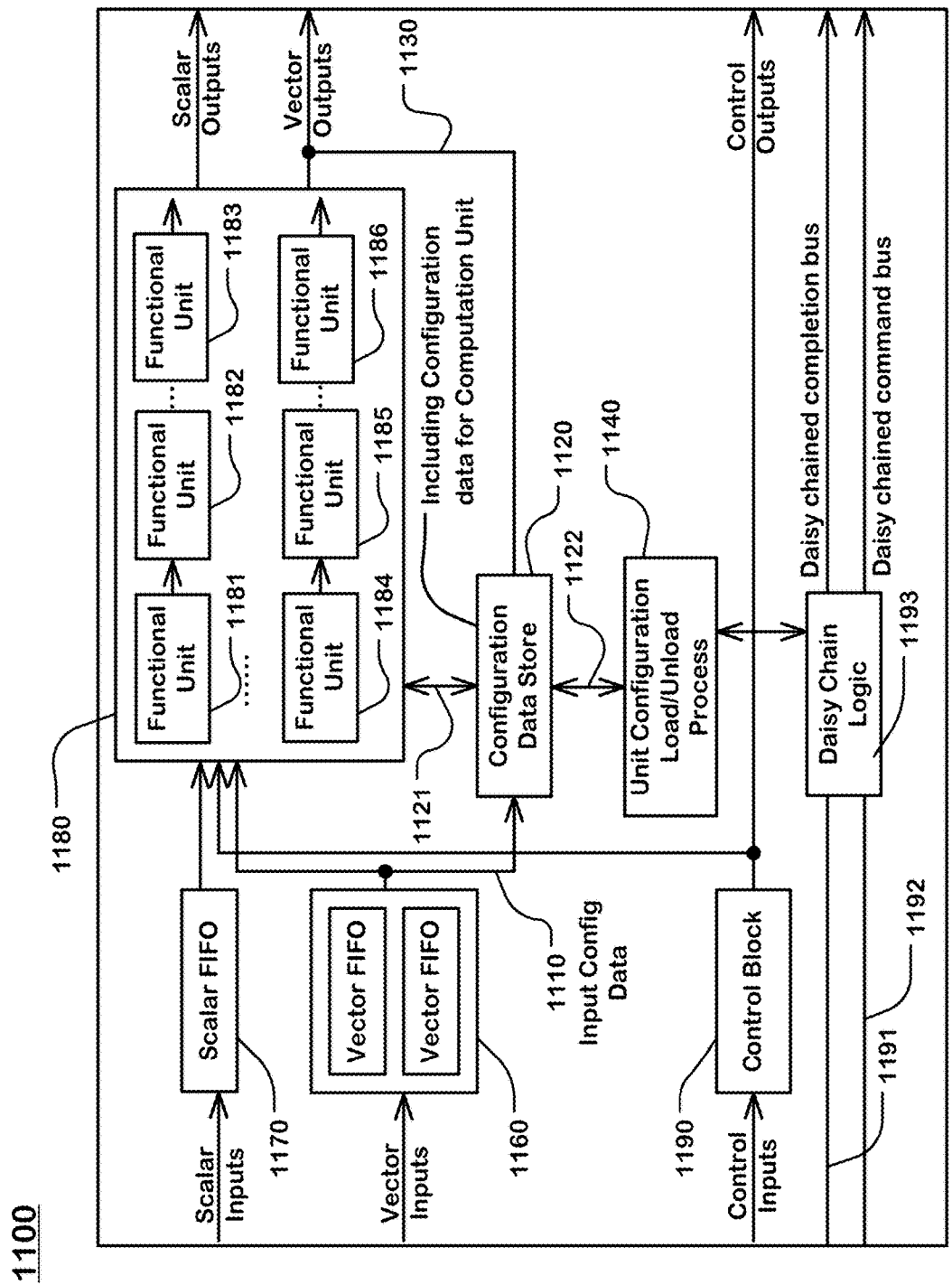
FIG. 11 is a block diagram illustrating an example configurable unit, such as a Pattern Compute Unit (PCU).
Figure 12:
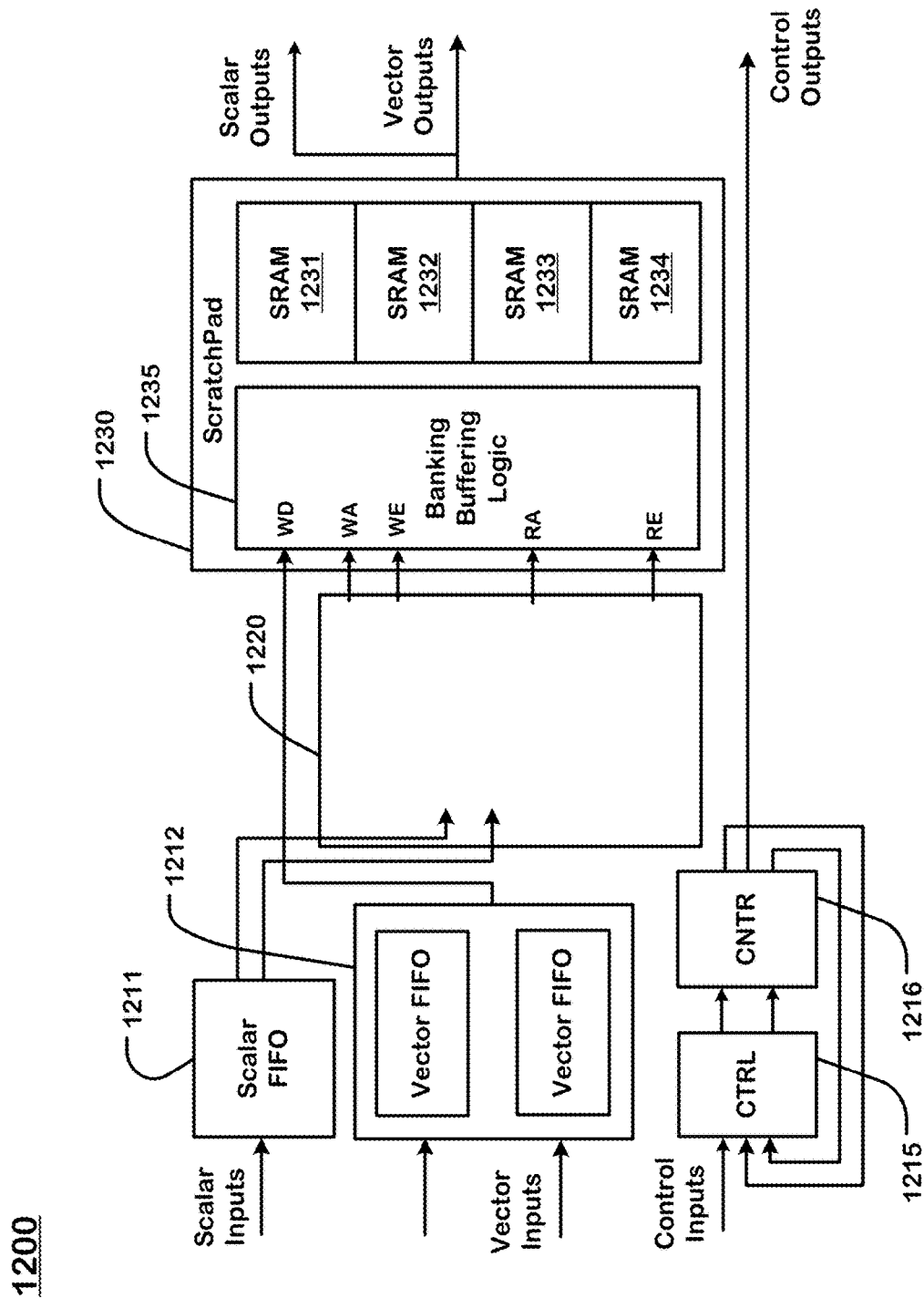
FIG. 12 is a block diagram illustrating an example configurable unit, such as a Pattern Memory Unit (PMU).

Configurable units in an array 890 of configurable units are further described in reference to FIGS. 11 and 12 and configured with the virtualization logic 897. Configurable units can include, or can have units configured to implement, a computation unit or computation units, as described herein.

The processor 810 includes an external I/O interface 830 connected to the host 820 by line 825, and an external I/O interface 850 connected to the memory 840 by line 845. The I/O interfaces 830, 850 connect via a bus system 815 to the array 890 of configurable units and to the configuration load/unload controller 895. The bus system 815 may have a bus width of carrying one chunk of data, which can be for this example 128 bits (references to 128 bits throughout can be considered as an example chunk size more generally).

To configure configurable units in the array 890 of configurable units with a configuration file, the host 820 can send the configuration file to the memory 840 via the interface 830, the bus system 815, and the interface 850 in the reconfigurable data processor 810. The configuration file can be loaded in many ways, as suits a particular architecture, including in data paths outside the configurable processor 810. The configuration file can be retrieved from the memory 840 via the memory interface 850. Chunks of the configuration file can then be sent in a distribution sequence to configurable units in the array 890 of configurable units in the reconfigurable data processor 810.

An external clock generator 870 or other clock line sources can provide a clock line 875 or clock lines to elements in the reconfigurable data processor 810, including the array 890 of configurable units, and the bus system 815, and the external data I/O interfaces. The bus system 815 can communicate data at a processor clock rate via a clock line 875 or clock lines.

Figure 9:
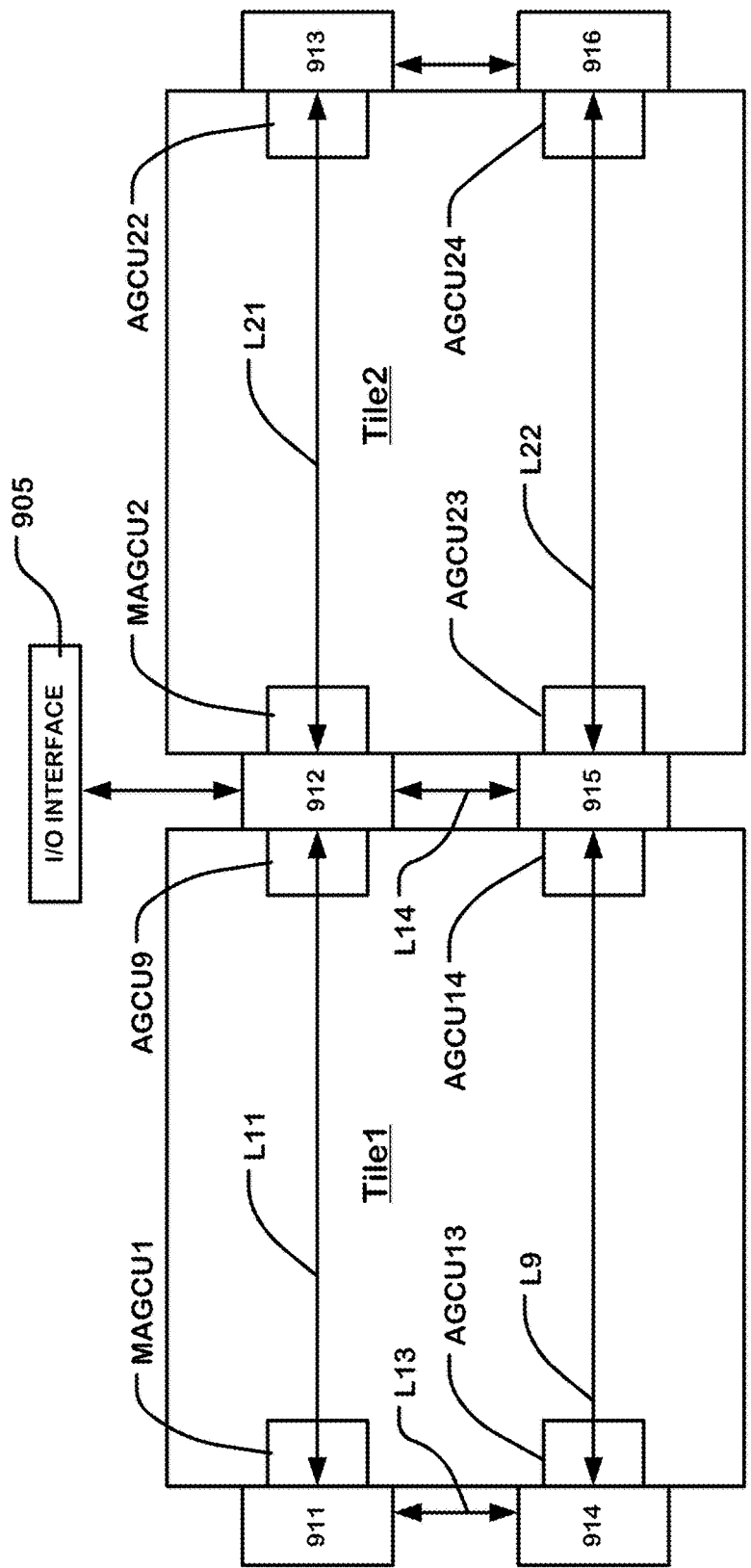
FIG. 9 is a simplified block diagram of a top-level network and components of a CGRA (Coarse Grain Reconfigurable Architecture).

FIG. 9 is a simplified block diagram 900 of components of a CGRA (coarse-grained reconfigurable architecture) processor. In this example, the CGRA processor has 2 tiles (Tile1, Tile2). The tile comprises an array of configurable units connected to a bus system, including array level networks in this example. An array of configurable units (e.g., 890, FIG. 8) in the tile includes computation units in hardware or by configuration of reconfigurable components, which are configured with the virtualization logic 897. The bus system includes a top-level network connecting the tiles to external I/O interface 905 (or any number of interfaces). In other embodiments, different bus system configurations may be utilized. The configurable units in each tile are nodes on the array level network in this embodiment.

Each of the tiles has 4 AGCUs (Address Generation and Coalescing Units) (e.g., MAGCU1, AGCU9, AGCU13, AGCU14). The AGCUs are nodes on the top-level network and nodes on the array level networks and include resources for routing data among nodes on the top-level network and nodes on the array level network in each tile.

Nodes on the top-level network in this example include one or more external I/Os, including interface 905. The interfaces to external devices include resources for routing data among nodes on the top-level network and external devices, such as high-capacity memory, host processors, other CGRA processors, FPGA devices and so on, that are connected to the interfaces.

One of the AGCUs in a tile is configured in this example to be a master AGCU, which includes an array configuration load/unload controller for the tile. In other embodiments, more than one array configuration load/unload controller can be implemented, and one array configuration load/unload controller may be implemented by logic distributed among more than one AGCU.

The MAGCU1 includes a configuration load/unload controller for Tile1, and MAGCU2 includes a configuration load/unload controller for Tile2. In other embodiments, a configuration load/unload controller can be designed for loading and unloading configuration of more than one tile. In other embodiments, more than one configuration controller can be designed for configuration of a single tile. Also, the configuration load/unload controller can be implemented in other portions of the system, including as a stand-alone node on the top-level network and the array level network or networks.

The top-level network is constructed using top-level switches (911, 913, 914, and 916) connecting to each other as well as to other nodes on the top-level network, including the AGCUs, and I/O interface 905. The top-level network includes links (e.g., L11, L9, L21, L22) connecting the top-level switches. Data travels in packets between the top-level switches on the links, and from the switches to the nodes on the network connected to the switches. For example, top-level switches 911 and 912 are connected by a link L11, top-level switches 914 and 915 are connected by a link L9, top-level switches 911 and 914 are connected by a link L13, and top-level switches 912 and 913 are connected by a link L21. The links can include one or more buses and supporting control lines, including for example a chunk-wide bus (vector bus). For example, the top-level network can include data, request and response channels operable in coordination for transfer of data in a manner analogous to an AXI compatible protocol. See, AMBA® AXI and ACE Protocol Specification, ARM, 209.

Top-level switches can be connected to AGCUs. For example, top-level switches 911, 912, 914, and 915 are connected to MAGCU1, AGCU9, AGCU13 and AGCU14 in the tile Tile1, respectively. Top-level switches 912, 913, 915, and 916 are connected to MAGCU2, AGCU22, AGCU23 and AGCU24 in the tile Tile2, respectively.

Top-level switches can be connected to one or more external I/O interfaces (e.g., interface 905).

FIG. 10A is a simplified diagram of a tile and an array level network usable in the configuration of FIG. 9, where the configurable units in the array are nodes on the array level network and are configurable to implement the virtualization logic 897.

In this example, the array of configurable units 1000 includes a plurality of types of configurable units, which are configured with the virtualization logic 897. The types of configurable units in this example, include Pattern Compute Units (PCU), Pattern Memory Units (PMU), switch units (S), and Address Generation and Coalescing Units (each including two address generators AG and a shared CU). For an example of the functions of these types of configurable units, see, Prabhakar et al., "Plasticine: A Reconfigurable Architecture For Parallel Patterns," ISCA '17, Jun. 24-28, 2017, Toronto, ON, Canada, which is incorporated by reference as if fully set forth herein. In this example, the PCUs (e.g., 1042) and PMUs (e.g., 1043) in the array of configurable units 1000 can include resources configurable for embodiment of a computation unit, an example configuration of which is described herein. Each of these configurable units contains a configuration store comprising a set of registers or flip-flops that represent either the setup or the sequence to run a program, and can include the number of nested loops, the limits of each loop iterator, the routes and/or instructions to be executed for each stage including stages, the source of the operands, and the network parameters for the input and output interfaces. The configuration file can include entries of lookup tables as described herein.

Additionally, each of these configurable units contains a configuration store comprising a set of registers or flip-flops that store status usable to track progress in nested loops or otherwise. A configuration file in the configuration store contains a bit-stream representing the initial configuration, or starting state, of each of the components that execute the program. This bit-stream is referred to as a bit file. Program load is the process of setting up the configuration stores in the array of configurable units based on the contents of the bit file to allow the components to execute a program (i.e., a machine), including programs that utilize the virtualization logic 897. Program Load may also require the load of all PMU memories.

The array level network includes links interconnecting configurable units in the array. The links in the array level network include one or more and, in this case, three kinds of physical buses: a chunk-level vector bus (e.g., 128 bits of data), a word-level scalar bus (e.g., 32 bits of data), and a multiple bit-level control bus. For instance, interconnect 1021 between switch units 1011 and 1012 includes a vector bus interconnect with a vector bus width of 128 bits, a scalar bus interconnect with a scalar bus width of 32 bits, and a control bus interconnect.

The three kinds of physical buses differ in the granularity of data being transferred. In one embodiment, the vector bus can carry a chunk that includes 16-Bytes (=128 bits) of data as its payload. The scalar bus can have a 32-bit payload and carry scalar operands or control information. In some machines implemented using this system, data can be represented using floating point data formats, including standard or non-standard formats. Example formats include FP32 and BF16, among others. It can be understood that the number of data values carried on the scalar and vector buses is a function of the encoding format of the data values, with FP32 utilizing 32 bits per value and BF16 using 16 bits per value.

The control bus can carry control handshakes such as tokens and other lines. The vector and scalar buses can be packet switched, including headers that indicate a destination of each packet and other information such as sequence numbers that can be used to reassemble a file when the packets are received out of order. Each packet header can contain a destination identifier that identifies the geographical coordinates of the destination switch unit (e.g., the row and column in the array), and an interface identifier that identifies the interface on the destination switch (e.g., North, South, East, West, etc.) used to reach the destination unit. The control network can be circuit switched based on timing circuits in the device, for example. The configuration load/ unload controller can generate a header for each chunk of configuration data of 128 bits. The header is transmitted on a header bus to each configurable unit in the array of configurable unit.

In one example, a chunk of data of 128 bits is transmitted on the vector bus that provides the chunk as vector inputs to a configurable unit. The vector bus can include 128 payload lines, and a set of header lines. The header can include a sequence ID for each chunk, which can include:

A bit to indicate if the chunk is scratchpad memory or configuration store data.
Bits that form a chunk number.
Bits that indicate a column identifier.
Bits that indicate a row identifier.
Bits that indicate a component identifier.

For a load operation, the configuration load controller can send the number N of chunks to a configurable unit in order from N−1 to 0. If, for example, N=6, the chunks are sent out in most-significant-bit-first order of Chunk 5->Chunk 4->Chunk 3->Chunk 2->Chunk 1->Chunk 0. (Note that this most-significant-bit-first order results in Chunk 5 being distributed in round 0 of the distribution sequence from the array configuration load controller.) For an unload operation, the configuration unload controller can write the unload data out of order to the memory. For both load and unload operations, the shifting in the configuration serial chains in a configuration data store in a configurable unit is from LSB (least-significant-bit) to MSB (most-significant-bit), or MSB out first.

Figure 10B:
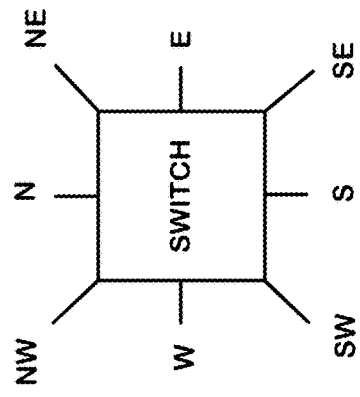
FIG. 10B illustrates an example switch unit connecting elements in an array level network.
Figure 10:
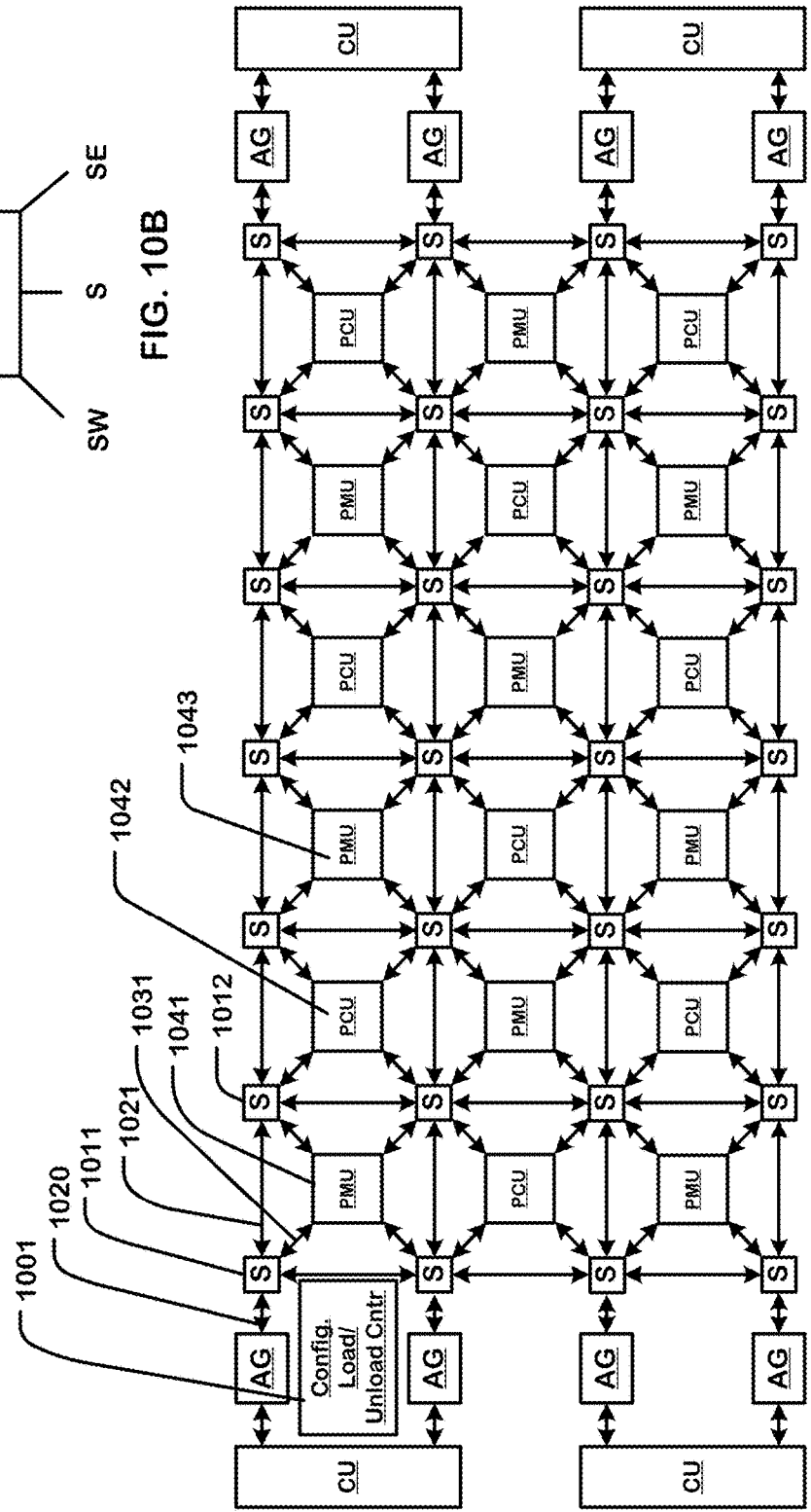
FIG. 10 is a simplified diagram of a tile and an array level network usable in the configuration of FIG. 8, where the configurable units are nodes on the array level network and are configurable to implement a lookup table with input offsetting.

FIG. 10B illustrates an example switch unit connecting elements in an array level network. As shown in the example of FIG. 10B, a switch unit can have 8 interfaces. The North, South, East and West interfaces of a switch unit are used for connections between switch units. The Northeast, Southeast, Northwest and Southwest interfaces of a switch unit are each used to make connections to PCU or PMU instances. A set of 2 switch units in each tile quadrant have connections to an Address Generation and Coalescing Unit (AGCU) that include multiple address generation (AG) units and a coalescing unit (CU) connected to the multiple address generation units. The coalescing unit (CU) arbitrates between the AGs and processes memory requests. Each of the eight interfaces of a switch unit can include a vector interface, a scalar interface, and a control interface to communicate with the vector network, the scalar network, and the control network.

During execution of a machine after configuration, data can be sent via one or more unit switches and one or more links between the unit switches to the configurable units using the vector bus and vector interface(s) of the one or more switch units on the array level network.

In embodiments described herein, a configuration file or bit file, before configuration of the tile, can be sent from the configuration load controller using the same vector bus, via one or more unit switches and one or more links between the unit switches to the configurable unit using the vector bus and vector interface(s) of the one or more switch units on the array level network. For instance, a chunk of configuration data in a unit file particular to a configurable unit PMU 1041 can be sent from the configuration load/unload controller 1001 to the PMU 1041, via a link 1020 between the configuration load/unload controller 1001 and the West (W) vector interface of the switch unit 1011, the switch unit 1011, and a link 1031 between the Southeast (SE) vector interface of the switch unit 1011 and the PMU 1041.

In this example, one of the AGCUs is configured to be a master AGCU, which includes a configuration load/unload controller (e.g., 1001). The master AGCU implements a register through which the host (820, FIG. 8) can send commands via the bus system to the master AGCU. The master AGCU controls operations on an array of configurable units in a tile and implements a program control state machine to track the state of the tile based on the commands it receives from the host through writes to the register. For every state transition, the master AGCU issues commands to all components on the tile over a daisy-chained command bus (FIG. 11). The commands include a program reset command to reset configurable units in an array of configurable units in a tile, and a program load command to load a configuration file to the configurable units.

The configuration load controller in the master AGCU is responsible for reading the configuration file from the memory and sending the configuration data to every configurable unit of the tile. The master AGCU can read the configuration file from the memory at preferably the maximum throughput of the top-level network. The data read from memory are transmitted by the master AGCU over the vector interface on the array level network to the corresponding configurable unit according to a distribution sequence described herein.

In one embodiment, in a way that can reduce the wiring requirements within a configurable unit, configuration and status registers holding unit files to be loaded in a configuration load process, or unloaded in a configuration unload process, in a component are connected in a serial chain and can be loaded through a process of shifting bits through the serial chain. In some embodiments, there may be more than one serial chain arranged in parallel or in series. When a configurable unit receives the for example 128 bits of configuration data from the master AGCU in one bus cycle, the configurable unit shifts this data through its serial chain at the rate of 1 bit per cycle, where shifter cycles can run at the same rate as the bus cycle. It will take 128 shifter cycles for a configurable unit to load 128 configuration bits with the 128 bits of data received over the vector interface. The 128 bits of configuration data are referred to as a chunk. A configurable unit can require multiple chunks of data to load all its configuration bits.

The configurable units interface with the memory through multiple memory interfaces (850, FIG. 8). Each of the memory interfaces can be accessed using several AGCUs. Each AGCU contains a reconfigurable scalar data path to generate requests for the off-chip memory. Each AGCU contains FIFOs (first-in-first-out buffers for organizing data) to buffer outgoing commands, data, and incoming responses from the off-chip memory.

FIG. 11 is a block diagram illustrating an example configurable unit 1100, such as a Pattern Compute Unit (PCU), which is configured with the virtualization logic 897. A configurable unit can interface with the scalar, vector, and control buses, in this example using three corresponding sets of inputs and outputs (TO): scalar inputs/outputs, vector inputs/outputs, and control inputs/outputs. Scalar IOs can be used to communicate single words of data (e.g., 32 bits). Vector IOs can be used to communicate chunks of data (e.g., 128 bits), in cases such as receiving configuration data in a unit configuration load process and transmitting and receiving data during operation after configuration across a long pipeline between multiple PCUs. Control IOs can be used to communicate signals on control lines such as the start or end of execution of a configurable unit. Control inputs are received by control block 1190, and control outputs are provided by the control block 1190.

Each vector input is buffered in this example using a vector FIFO in a vector FIFO block 1160 which can include one or more vector FIFOs. Likewise, in this example, each scalar input is buffered using a scalar FIFO 1170. Using input FIFOs decouples timing between data producers and consumers and simplifies inter-configurable-unit control logic by making it robust to input delay mismatches.

A configurable unit includes multiple reconfigurable data paths in block 1180. A data path in a configurable unit can be organized as a multi-stage (Stage 1 . . . Stage N), reconfigurable SIMD (Single Instruction, Multiple Data) pipeline. The chunks of data pushed into the configuration serial chain in a configurable unit include configuration data for each stage of each data path in the configurable unit. The configuration serial chain in the configuration data store 1120 is connected to the multiple data paths in block 1180 via lines 1121.

A configurable data path organized as a multi-stage pipeline can include multiple functional units (e.g., 1181, 1182, 1183, 1184, 1185, 1186) at respective stages. A computation unit or parts of a computation unit can be implemented in multiple functional units at respective stages in a multi-stage pipeline or in multiple multi-stage pipelines. In the example as shown in FIG. 9, a circuit including the virtualization logic 897 can be implemented in multiple functional units and multiple memory units. Input registers in functional units can register inputs from scalar FIFOs 1170 or Vector FIFOs 1160 or from previous stages in a multi-stage pipeline. A functional unit at a stage in a multi-stage pipeline can execute a function, e.g., logical shift, an arithmetic function, comparison, a logical operation, etc., and generate an output.

Configurable units in the array of configurable units include configuration data stores 1120 (e.g., serial chains) to store unit files comprising a plurality of chunks (or sub-files of other sizes) of configuration data particular to the corresponding configurable units. Configurable units in the array of configurable units each include unit configuration load logic 1140 connected to the configuration data store 1120 via line 1122, to execute a unit configuration load process. The unit configuration load process includes receiving, via the bus system (e.g., the vector inputs), chunks of a unit file particular to the configurable unit and loading the received chunks into the configuration data store 1120 of the configurable unit. The unit file loaded into the configuration data store 1120 can include configuration data, including opcodes and routing configuration, for circuits (e.g., module) implementing the virtualization logic 897 in multiple functional units and multiple memory units, as described herein.

The configuration data stores in configurable units in the plurality of configurable units in this example comprise serial chains of latches, where the latches store bits that control configuration of the resources in the configurable unit. A serial chain in a configuration data store can include a shift register chain for configuration data and a second shift register chain for state information and counter values connected in series.

Input configuration data 1110 can be provided to a vector FIFO as vector inputs, and then be transferred to the configuration data store 1120. Output configuration data 1130 can be unloaded from the configuration data store 1120 using the vector outputs.

The CGRA uses a daisy-chained completion bus to indicate when a load/unload command has been completed. The master AGCU transmits the program load and unload commands to configurable units in the array of configurable units over a daisy-chained command bus. As shown in the example of FIG. 11, a control block 1190, a daisy-chained completion bus 1191 and a daisy-chained command bus 1192 are connected to daisy-chain logic 1193, which communicates with the unit configuration load logic 1140. The daisy-chain logic 1193 can include load complete status logic, as described below. The daisy-chained completion bus is further described below. Other topologies for the command and completion buses are clearly possible but not described here.

FIG. 12 is a block diagram illustrating an example configurable unit 1200, such as a Pattern Memory Unit (PMU), which is configured with the virtualization logic 897 (i.e., ready-to-read credit counters, write credit counters, and flow control logic for operating them). A PMU can contain scratchpad memory 1230 coupled with a reconfigurable scalar data path 1220 intended for address calculation (RA, WA) and control (WE, RE) of the scratchpad memory 1230, along with the bus interfaces used in the PCU (FIG. 11).

The bus interfaces can include scalar inputs, vector inputs, scalar outputs and vector outputs, usable to provide write data WD. The data path can be organized as a multi-stage reconfigurable pipeline, including stages of functional units FUs and associated pipeline registers PRs that register inputs and outputs of the functional units. PMUs can be used to store distributed on-chip memory throughout the array of reconfigurable units.

A scratchpad is built with multiple SRAM banks (e.g., 1231, 1232, 1233, 1234). Banking and buffering logic 1235 for the SRAM banks in the scratchpad can be configured to operate in several banking modes to support various access patterns. A computation unit as described herein can include a lookup table stored in the scratchpad memory 1230, from a configuration file or from other sources. In a computation unit as described herein, the scalar data path 1220 can translate a section of a raw input value I for addressing lookup tables implementing a function f(I), into the addressing format utilized by the SRAM scratchpad memory 1230, adding appropriate offsets and so on, to read the entries of the lookup table stored in the scratchpad memory 1230 using the sections of the input value I. Each PMU can include write address calculation logic and read address calculation logic that provide write address WA, write enable WE, read address RA and read enable RE to the banking buffering logic 1235. Based on the state of the local FIFOs 1211 and 1212 and external control inputs, the control block 1215 can be configured to trigger the write address computation, read address computation, or both, by enabling the appropriate counters 1216. A programmable counter chain 1216 (Control Inputs, Control Outputs) and control block 1215 can trigger PMU execution.

This is one simplified example of a configuration of a configurable processor for implementing a computation unit as described herein. The configurable processor can be configured in other ways to implement a computation unit. Other types of configurable processors can implement the computation unit in other ways. Also, the computation unit can be implemented using dedicated logic in some examples, or a combination of dedicated logic and instruction-controlled processors.

FIG. 13 depicts one implementation of a computer-implemented method of runtime patching of configuration files.

At action 1302, the method includes storing a dataflow graph for an application, the dataflow graph having operation units that are configured to be producers to produce tensors for execution of the application, and to be consumers to consume the tensors for execution of the application.

At action 1312, the method includes storing write access patterns of the producers, and read access patterns of the consumers. A a write access pattern of a particular producer specifies an order in which the particular producer generates elements of a tensor, and a read access pattern of a corresponding consumer specifies an order in which the corresponding consumer processes the elements of the tensor.

At action 1322, the method includes detecting conflicts between certain ones of the producers and corresponding ones of the consumers that have mismatches between the write access patterns and the read access patterns. A conflict occurs when the order in which the particular producer generates the elements of the tensor is different from the order in which the corresponding consumer processes the elements of the tensor.

At action 1332, the method includes resolving the conflicts by inserting buffers between the certain ones of the producers and the corresponding ones of the consumers.

While the present invention is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the invention and the scope of the following claims.

What is claimed is:

1. A data processing system, comprising:
   memory storing a dataflow graph for an application, the dataflow graph having operation units that are configured to be producers to produce tensors for execution of the application, and to be consumers to consume the tensors for execution of the application;
   the memory storing write access patterns of the producers, and read access patterns of the consumers, wherein a write access pattern of a particular producer specifies an order in which the particular producer generates elements of a tensor, and a read access pattern of a corresponding consumer specifies an order in which the corresponding consumer processes the elements of the tensor; and
   a compile time logic having access to the memory and configured to process the dataflow graph to
      detect conflicts between certain ones of the producers and corresponding ones of the consumers that have mismatches between the write access patterns and the read access patterns, wherein a conflict occurs when the order in which the particular producer generates the elements of the tensor is different from the order in which the corresponding consumer processes the elements of the tensor; and
      resolve the conflicts by inserting buffers between the certain ones of the producers and the corresponding ones of the consumers.

2. The data processing system of claim 1, wherein certain ones of the producers are configured to write elements of the tensors in the buffers in accordance with the write access patterns.

3. The data processing system of claim 2, wherein corresponding ones of the consumers are configured to read the elements of the tensors from the buffers in accordance with the read access patterns.

4. The data processing system of claim 1, wherein the compile time logic is further configured to detect a group of corresponding consumers that have a same read access pattern for processing the elements of the tensor.

5. The data processing system of claim 4, wherein the compile time logic is further configured to insert a single buffer between the group of corresponding consumers and the particular producer.

6. The data processing system of claim 5, wherein the particular producer is configured to write the elements of the tensor in the single buffer in accordance with the write access pattern.

7. The data processing system of claim 6, wherein consumers in the group of corresponding consumers are configured to read the elements of the tensor from the single buffer in accordance with the read access pattern.

8. The data processing system of claim 1, wherein the write access patterns and the read access patterns are defined based on operation types implemented by the operation units.

9. The data processing system of claim 1, wherein the compile time logic is further configured to generate a modified version of the dataflow graph with buffers inserted between the certain ones of the producers and the corresponding ones of the consumers.

10. The data processing system of claim 9, wherein runtime logic is configured to allocate physical compute units and physical memory units of a reconfigurable processor to the modified version of the dataflow graph.

11. The data processing system of claim 10, wherein the runtime logic is configured to execute the modified version of the dataflow graph on the reconfigurable processor based on the allocation.

12. A computer-implemented method, including:
   storing a dataflow graph for an application, the dataflow graph having operation units that are configured to be producers to produce tensors for execution of the application, and to be consumers to consume the tensors for execution of the application;
   storing write access patterns of the producers, and read access patterns of the consumers, wherein a write access pattern of a particular producer specifies an order in which the particular producer generates elements of a tensor, and a read access pattern of a corresponding consumer specifies an order in which the corresponding consumer processes the elements of the tensor; and
   detecting conflicts between certain ones of the producers and corresponding ones of the consumers that have mismatches between the write access patterns and the read access patterns, wherein a conflict occurs when the order in which the particular producer generates the elements of the tensor is different from the order in which the corresponding consumer processes the elements of the tensor; and
   resolving the conflicts by inserting buffers between the certain ones of the producers and the corresponding ones of the consumers.

13. The computer-implemented method of claim 12, wherein the certain ones of the producers are configured to write elements of the tensors in the buffers in accordance with the write access patterns.

14. The computer-implemented method of claim 13, wherein the corresponding ones of the consumers are configured to read the elements of the tensors from the buffers in accordance with the read access patterns.

15. The computer-implemented method of claim 12, wherein the compile time logic is further configured to detect a group of corresponding consumers that have a same read access pattern for processing the elements of the tensor.

16. The computer-implemented method of claim 15, wherein the compile time logic is further configured to insert a single buffer between the group of corresponding consumers and the particular producer.

17. The computer-implemented method of claim 16, wherein the particular producer is configured to write the elements of the tensor in the single buffer in accordance with the write access pattern.

18. A non-transitory computer readable storage medium impressed with computer program instructions to process data, the instructions, when executed on a processor, implement a method comprising:

storing a dataflow graph for an application, the dataflow graph having operation units that are configured to be producers to produce tensors for execution of the application, and to be consumers to consume the tensors for execution of the application;

storing write access patterns of the producers, and read access patterns of the consumers, wherein a write access pattern of a particular producer specifies an order in which the particular producer generates elements of a tensor, and a read access pattern of a corresponding consumer specifies an order in which the corresponding consumer processes the elements of the tensor; and detecting conflicts between certain ones of the producers and corresponding ones of the consumers that have mismatches between the write access patterns and the read access patterns, wherein a conflict occurs when the order in which the particular producer generates the elements of the tensor is different from the order in which the corresponding consumer processes the elements of the tensor; and resolving the conflicts by inserting buffers between the certain ones of the producers and the corresponding ones of the consumers.

19. The non-transitory computer readable storage medium of claim 18, wherein the certain ones of the producers are configured to write elements of the tensors in the buffers in accordance with the write access patterns.

20. The non-transitory computer readable storage medium of claim 19, wherein the corresponding ones of the consumers are configured to read the elements of the tensors from the buffers in accordance with the read access patterns.

\* \* \* \* \*